United States Patent [19]
Hasuo et al.

[11] Patent Number: 5,708,513
[45] Date of Patent: Jan. 13, 1998

[54] IMAGE PROCESSING METHOD AND APPARATUS FOR PROCESSING A LARGE-SIZE ORIGINAL

[75] Inventors: Kamon Hasuo, Kawasaki; Takeshi Nakamura, Inagi, both of Japan

[73] Assignee: Canon Kabushiki Kaisha, Tokyo, Japan

[21] Appl. No.: 715,794

[22] Filed: Sep. 19, 1996

Related U.S. Application Data

[63] Continuation of Ser. No. 413,450, Mar. 30, 1995, abandoned.

[30] Foreign Application Priority Data

Apr. 4, 1994 [JP] Japan ................. 6-089171

[51] Int. Cl.⁶ ..................... H04N 1/387; G03G 15/00
[52] U.S. Cl. ........................ 358/450; 399/365
[58] Field of Search ........................ 399/6, 1, 365; 358/401, 450, 540; 382/167, 199, 217, 218, 284, 287, 298, 305

[56] References Cited

U.S. PATENT DOCUMENTS

| | | | |
|---|---|---|---|
| 5,038,222 | 8/1991 | Saito | 358/401 |
| 5,140,647 | 8/1992 | Ise et al. | 382/284 |
| 5,335,005 | 8/1994 | Sellers | 355/320 X |
| 5,363,504 | 11/1994 | Hasuo | 395/615 |
| 5,452,105 | 9/1995 | Tamagaki et al. | 382/167 |
| 5,465,163 | 11/1995 | Yoshihara et al. | 358/450 X |
| 5,515,181 | 5/1996 | Iyoda et al. | 358/450 X |
| 5,517,319 | 5/1996 | Arai | 358/450 X |

FOREIGN PATENT DOCUMENTS

| | | |
|---|---|---|
| 0505916 | 9/1992 | European Pat. Off. |
| 2-129833 | 6/1987 | Japan |
| 3-062050 | 3/1991 | Japan |
| 5-145742 | 6/1993 | Japan |
| 2-265785 | 10/1993 | United Kingdom |

Primary Examiner—S. Lee
Attorney, Agent, or Firm—Fitzpatrick, Cella, Harper & Scinto

[57] ABSTRACT

A large-size (A3-size) original is folded into two small-size (A4-size) portions. Images on the surfaces of the respective portions are read by image reading units. Image data output from the image reading units are stored in a memory. A detection unit detects end positions of the read images, and skew of each of the images is corrected. An image synthesis unit synthesizes the image data of the respective surfaces based on the output of the detection unit to provide the original single image. Thus, it is possible to read even a large-size original.

14 Claims, 27 Drawing Sheets

FIG.4
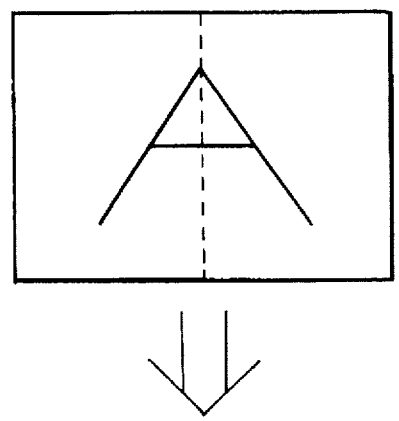
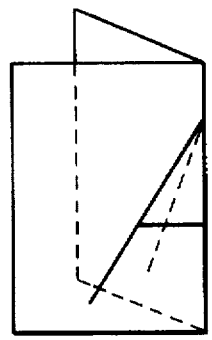
FIG.5
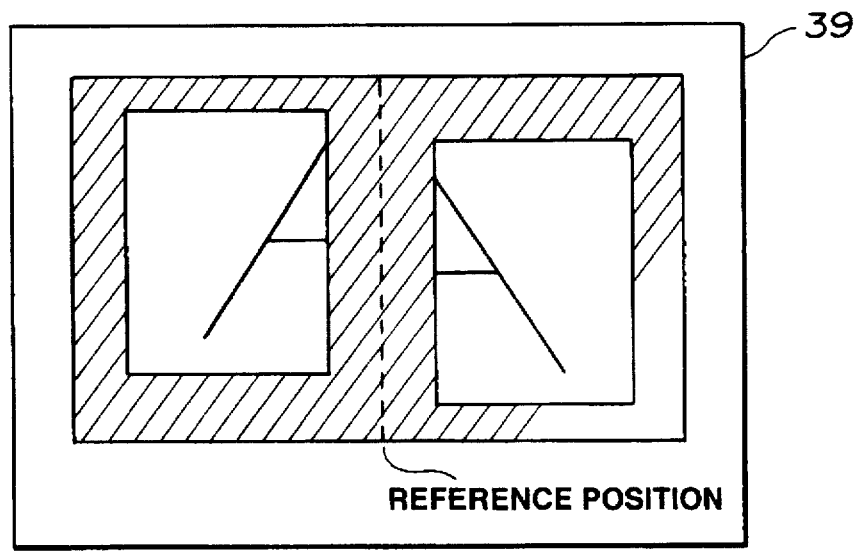

FIG.15

DOCUMENT CONTROL FILE

| DELETION | IMAGE-INDEX PATTERN | KEYWORD | KEY NO. | DATE OF PREPARATION | DATE OF MODIFICATION | TOTAL NUMBER OF PAGES | PAGE FILE POINTER |
|---|---|---|---|---|---|---|---|
| 1 | 100100 ··· | COMPONENT CATALOG | 337 | 91.05.02 | 92.01.08 | 3 | 1 |
| 1 | 100010 ··· | COMPONENT DRAWING | 150 | 92.02.05 | 92.03.05 | 2 | 4 |
| ·· | ·· | ·· | ·· | ·· | ·· | ·· | ·· |
| 0 | 01000 ··· | REPORT | 110 | 90.01.25 | 90.01.26 | 2 | 8 |
| 1 | 100010 ··· | COMPONENT DRAWING | 151 | 92.02.07 | 92.03.21 | 2 | 10 |
| ·· | ·· | ·· | ·· | ·· | ·· | ·· | ·· |

FIG.16
PAGE CONTROL FILE

| | DELETION | SURFACE/BACK MODE | OTHER IMAGE INFORMATION | NODE NUMBER |
|---|---|---|---|---|
| 1 | 1 | ONE FACE | ～ | 5 |
| 2 | 1 | ONE FACE | ～ | 6 |
| 3 | 1 | ONE FACE | ～ | 7 |
| 4 | 1 | SYNTHESIS | ～ | 12 |
| 5 | 1 | BOTH FACE | ～ | 13 |
| ⋮ | ⋮ | ⋮ | ⋮ | ⋮ |
| 8 | 1 | ONE FACE | ～ | 1 |
| 9 | 1 | ONE FACE | ～ | 2 |
| 10 | 1 | BOTH FACES-SURFACE | ～ | 20 |
| 11 | 1 | BOTH FACES-BACK | ～ | 20 |
| ⋮ | ⋮ | ⋮ | | ⋮ |

FIG.17
NODE TABLE

| | DATA SIZE | FAT ENTRY |
|---|---|---|
| 1 | 87654 | 23B6 |
| 2 | 56789 | 3342 |
| ⋮ | | |
| 5 | 76543 | 5658 |
| 6 | 23599 | 56A0 |
| 7 | 98765 | 570C |
| ⋮ | | |
| 12 | 89765 | 62B0 |
| 13 | 98752 | 632B |
| ⋮ | | |
| 20 | 87875 | 5086 |

| CLUSTER NUMBER | PHYSICAL ADDRESS ||
| --- | --- | --- |
| | TRACK NUMBER | SECTOR NUMBER |
| 0 | 0 | 1~8 |
| 1 | 0 | 9~16 |
| 2 | 1 | 1~8 |
| ⋮ | ⋮ | ⋮ |

FIG.20

| 62AC | 62AD | 62AE | 62AF | 62B0 | 62B1 | 62B2 | 62B3 | 62B4 | ... | 62BA | 62BB | 62BC | 62BD | ... |
|------|------|------|------|------|------|------|------|------|-----|------|------|------|------|-----|
| 0000 | FFFE | FFFE | FFFE | 62B1 | 62B2 | ...  | ...  |      | ... | 0000 | FFFF | FFFF | FFFF | ... |

ERASED REGION

REGION BEING USED

UNUSED REGION

FFFF : UNUSED
FFFE : ERASED
0000 : FINAL CLUSTER OF FILE

FIG.24
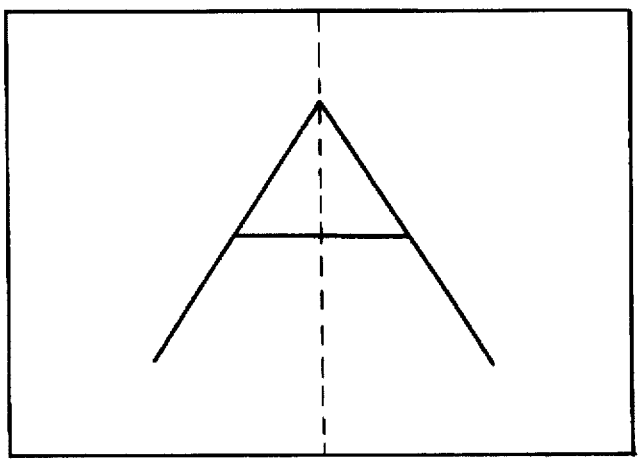
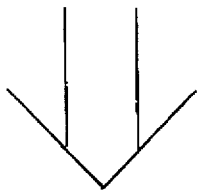
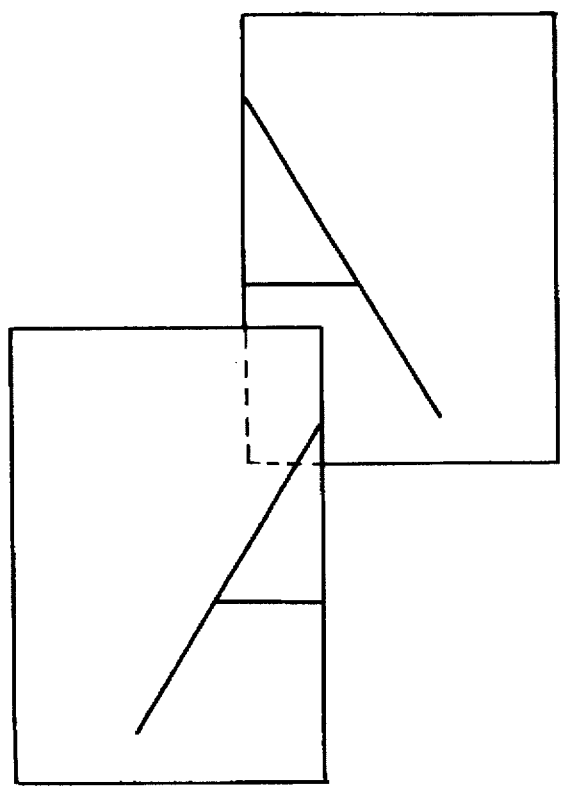

FIG.33
REFERENCE POSITION
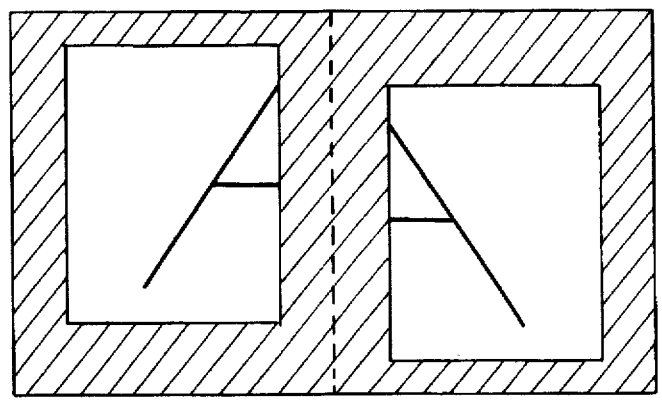
⇩ (A)
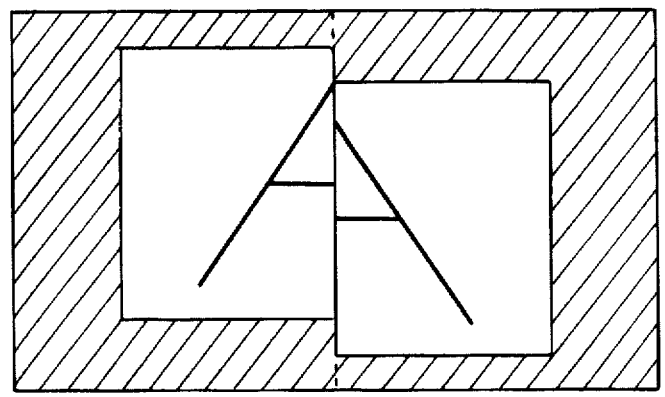
⇩ (B)
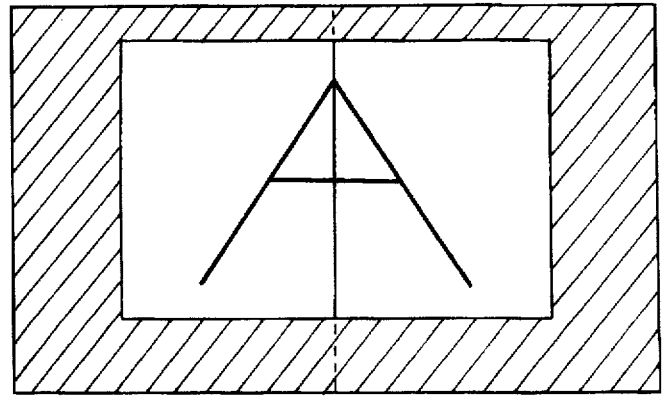

1

IMAGE PROCESSING METHOD AND APPARATUS FOR PROCESSING A LARGE-SIZE ORIGINAL

This application is a continuation of application Ser. No. 08/413,450 filed Mar. 30, 1995, now abandoned.

BACKGROUND OF THE INVENTION

1. Field of the Invention

This invention relates to an image processing method and apparatus in which images of an original are read and synthesized.

2. Description of the Related Art

As disclosed, for example, in Japanese Patent Laid-Open Application (Kokai) No. 5-145742 (1993), in order to synthesize images of an original whose size is greater than the maximum size readable by a scanner, image synthesis apparatuses have been proposed in which an image of an original is divided into a plurality of images, the divided images are read, the read images are synthesized again into a single image, and the synthesized image is output.

In the above-described conventional approach, however, when reading an image of an original while dividing the image, the operator must perform parallel movement of the original, thereby causing a difficulty in performing such an operation that synthesized portions of the synthesized image do not shift with each other, and therefore insufficient quality of the synthesized image.

In addition, a much longer time is required for reading an original than in an ordinary reading operation.

U.S. Pat. No. 5,465,163 also describes a method in which an image of an original whose size is greater than the maximum size readable by a scanner is divided into a plurality of areas, the divided areas are sequentially read, the contents of end portions of each of the read images are recognized, and the read images are synthesized so that end portions of adjacent images do not overlap with each other.

Even in such an approach, however, an operation of reading an original must be repeated, thereby resulting in inferior operability.

SUMMARY OF THE INVENTION

It is an object of the present invention to provide an image processing method and apparatus in which the above-described problems are overcome.

It is another object of the present invention to provide an image processing method and apparatus in which images of a large-size original can be efficiently read and synthesized.

It is still another object of the present invention to provide an image processing method and apparatus in which utilizing a reading device capable of simultaneously reading images on both surfaces of a sheet, images on an original which has been folded into two portions can be read and synthesized.

It is yet another object of the present invention to provide an image processing method and apparatus in which images at edges of an original which has been folded into two portions are corrected, so that a high-quality image can be obtained.

According to one aspect, the present invention, which achieves these objectives, relates to an image synthesis apparatus comprising first reading means for reading an image on the surface of an original, second reading means for reading an image on the back of the original, setting means for setting a mode of reading images on a folded original, connection means for connecting an image on a first surface of the folded original read by the first reading means and an image on a second surface of the folded original read by the second reading means to each other as a single image when the mode has been set by the setting means, and processing means for processing the image connected by the connection means when the mode has been set by the setting means.

According to another aspect, the present invention relates to an image processing apparatus comprising first reading means for reading an image on the surface of an original, second reading means for reading an image on the back of the original, assigning means for assigning one of a first reading mode of reading an image on one surface of a small-size original, a second reading mode of reading images on both surfaces of the small-size original, and a third reading mode of reading an image on one surface of a large-size original, and processing means for processing an image signal output from the first reading means when the first reading mode has been assigned, and for processing an image signal output from the first reading means and an image signal output from the second reading means when the second reading mode or the third reading mode has been assigned.

According to still another aspect, the present invention relates to an image synthesis method using an image reading apparatus comprising first reading means for reading an image on the surface of an original and second reading means for reading an image on the back of the original, comprising the steps of setting a mode of reading images on a folded original, reading an image on a first surface of the folded original by the first reading means and reading an image on a second surface of the folded original by the second reading means, connecting the image on the first surface read by the first reading means and the image on the second surface read by the second reading means to each other as a single image, and processing the connected image.

According to yet another aspect, the present invention relates to an image synthesis method using an image reading apparatus comprising first reading means for reading an image on the surface of an original and second reading means for reading an image on the back of the original, comprising the steps of setting one of a first reading mode of reading an image on one surface of a small-size original, a second mode reading mode of reading images on both surfaces of the small-size original, and a third reading mode of reading an image on one surface of a large-size original, and processing an image signal output from the first reading means when the first reading mode has been set, and processing an image signal output from the first reading means and an image signal output from the second reading means when the second reading mode or the third reading mode has been set.

The foregoing and other objects, advantages and features of the present invention will become more apparent from the following detailed description of the preferred embodiments taken in conjunction with the accompanying drawings.

BRIEF DESCRIPTION OF THE DRAWINGS

FIG. 4 is a diagram illustrating a state in which a large-size original is folded;

FIG. 5 is a diagram illustrating a state of read image data of the folded original;

FIG. 15 is a diagram illustrating a document control file;

FIG. 16 is a diagram illustrating a page control file;

FIG. 17 is a diagram illustrating a node table;

FIG. 20 is a diagram illustrating a FAT (file allocation table);

FIG. 24 is a diagram illustrating a state in which a large-size original is cut and divided;

FIG. 33 is a diagram illustrating an image moving method.

DETAILED DESCRIPTION OF THE PREFERRED EMBODIMENTS

Figure 1:
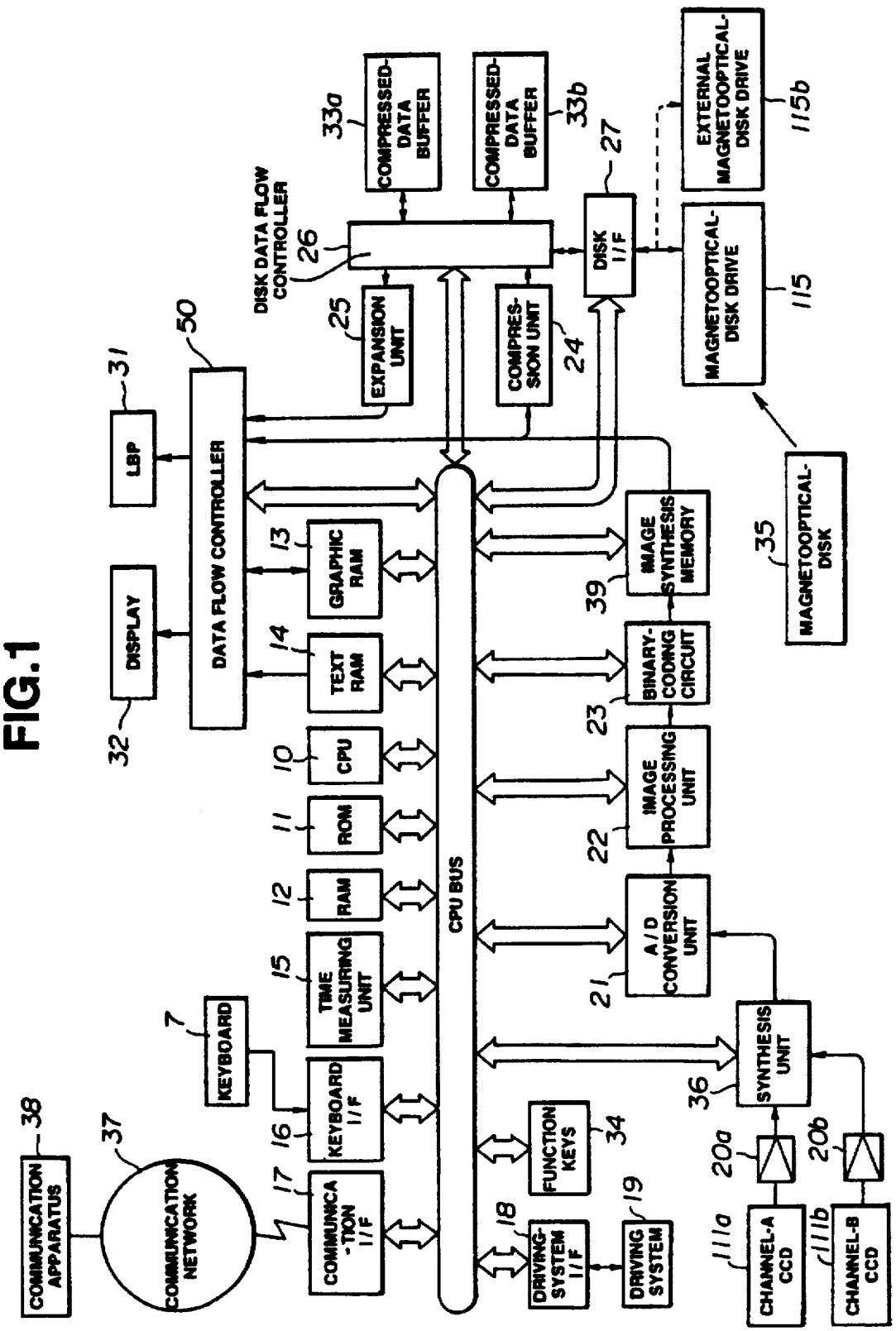
FIG. 1 is a diagram illustrating the configuration of circuitry of an image filing apparatus according to a first embodiment of the present invention.

FIG. 1 is a block diagram illustrating the configuration of circuitry of an image filing apparatus according to a first embodiment of the present invention.

This image filing apparatus includes a CPU (central processing unit) 10 for controlling the entire apparatus, a ROM (read-only memory) 11 for storing operation programs for the CPU 10, a RAM (random access memory) 12 used, for example, as working areas for the CPU 10, loading areas for data and programs from a magnetooptical-disk storage device 115, and a communication interface circuit 17 for communicating image data with a communication apparatus 38 via a communication network 37.

The image filing apparatus also includes a keyboard 7, a keyboard interface circuit 18 for connecting the keyboard 7 to a system bus 30, a time measuring unit 15 connected to the system bus 30, a magnetooptical-disk-storage-device interface circuit 27 for connecting magnetooptical-disk storage devices 115 and 115b to the system bus 30, and a data flow controller 50 for controlling the flow of data between a liquid-crystal display 32, an LBP (laser-beam printer) 31, a text RAM 14, a graphic RAM 13, the system bus 30 and the like.

The image filing apparatus further includes a driving-system interface circuit 18 for connecting a driving system 19 for an image reading device to the system bus 30, a channel-A CCD (charge-coupled device) 111a for reading one surface of an original, a channel-B CCD 111b for reading the other surface of the original, amplifiers 20a and 20b for amplifying the outputs of the CCD's 111a and 111b, respectively, a synthesis unit 36 for synthesizing an image signal on channel A and an image signal on channel B, an A/D conversion unit 21 for converting an image signal output from the synthesis unit 36, which has synthesized signals from the CCD's 111a and 111b, into a digital signal, an image processing unit 22 for adjusting the density and contrast of an image, a binary-coding circuit 23 for converting an output signal from the image processing unit 22 into binary image data, and an image synthesis memory 39 for storing the binary-coded image data and performing image synthesis.

The image filing apparatus further includes function keys 34 for instructing various kinds of process functions of the apparatus, a compression unit 24 for compressing the image data stored in the image synthesis memory 39, an expansion unit 25 for expanding the compressed image data, compressed-data buffers 33a and 33b for storing the compressed data, a disk interface circuit 27 for inputting data in and outputting data from the magnetooptical-disk storage device 115, and a disk data flow controller 26 for controlling the flow of data between the compression unit 24, the expansion unit 25, the compressed-data buffers 33a and 33b, and the disk interface circuit 27.

Figure 2:
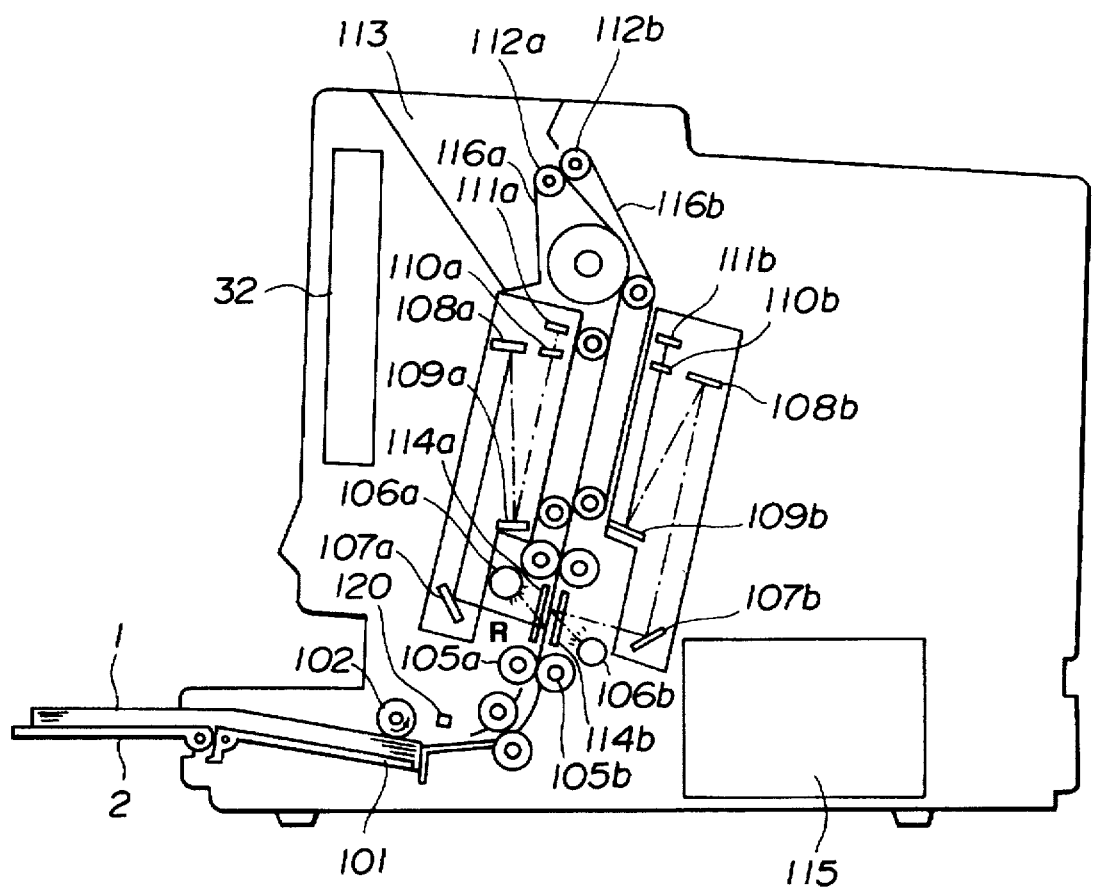
FIG. 2 is a cross-sectional view illustrating the internal structure of the image filing apparatus of the first embodiment.

FIG. 2 is a schematic cross-sectional view illustrating the internal structure of the image filing apparatus of the first embodiment. FIG. S is a perspective view illustrating an external appearance of the image filing apparatus of the first embodiment.

Figure 3:
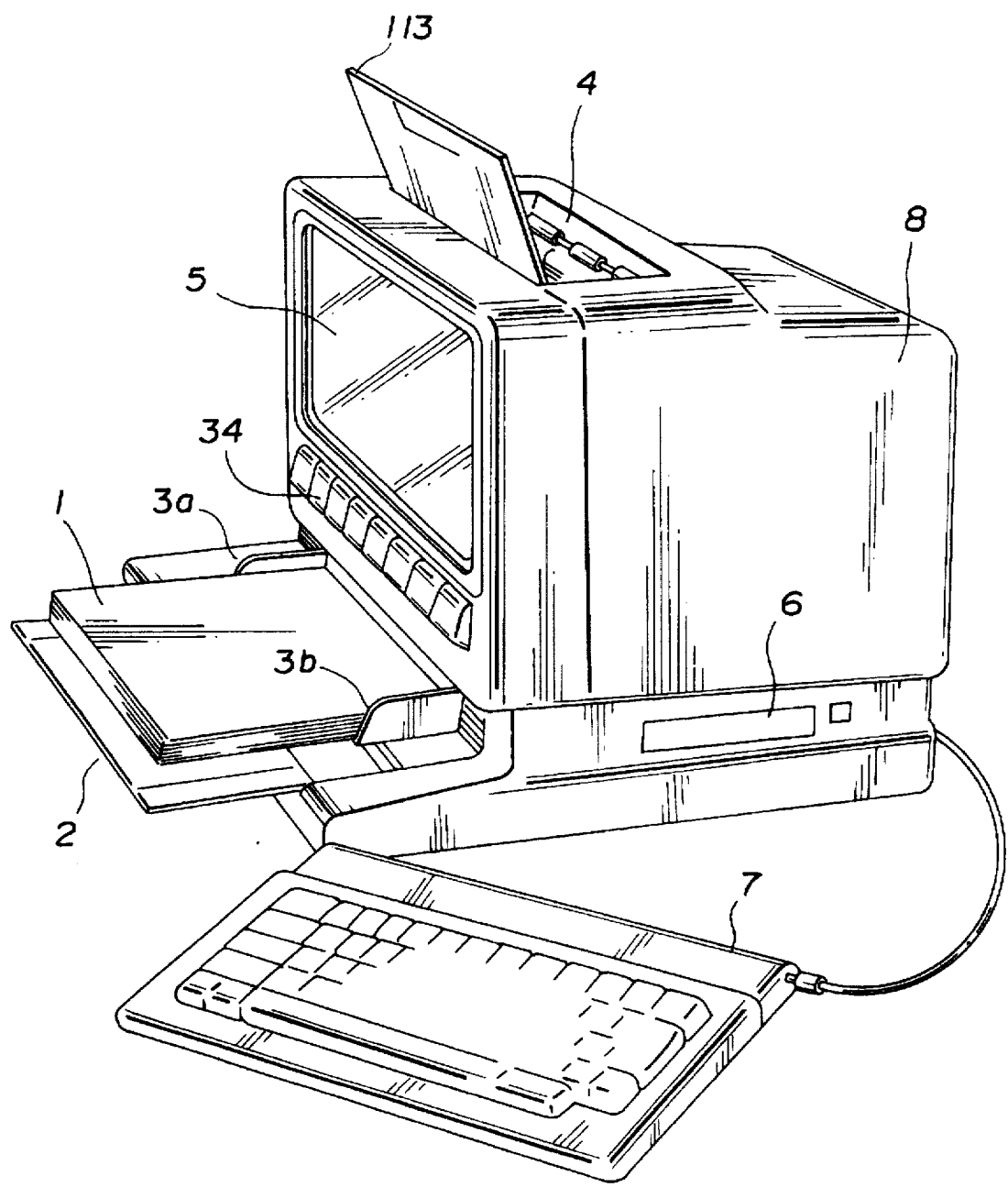
FIG. 3 is a perspective view illustrating an external appearance of the image filing apparatus of the first embodiment.

In FIGS. 2 and 3, originals 1 are mounted on an original mount 2 provided at a lower front portion of a case 8 of the apparatus, and are stacked and positioned by regulation plates 3a and 3b shown in FIG. 3.

As shown in FIG. 3, a sheet-discharging portion 4 for the original 1 is opened at an upper portion of the case 8, and a sheet-discharging tray 113 is provided. A screen 5 for displaying image information, operation instructions and the like is provided at a front portion of the case 8, and a liquid-crystal display 32 shown in FIG. 2 is provided inside the screen 5.

An insertion port 6 for inserting a magnetooptical disk is provided at a side of the case 8. The apparatus also includes the keyboard 7 for inputting, for example, a key word for image retrieval.

As shown in FIG. 2, the case 8 contains original-feeding rollers 102, 105a and 105b, fluorescent lamps 106a and 108b for illuminating an original, mirrors 107a, 107b, 108a, 108b, 109a and 109b, lenses 110a and 110b, sheet-discharging rollers 112a and 112b, original-conveying belts 118a and 118b, an original sensor 120, original-backup members 114a and 114b, and the like. Motors, serving as driving sources for these rollers and belts, are not shown. The functions of these components will be described later.

A description will now be provided of operations of the apparatus of the first embodiment in the sequence of: (1) turning-on of a power supply, (2) storage of an image index, (3) selection of an image index, (4) reading of an image of an original, (5) synthesis of images, (6) storage of images, and (7) retrieval of an image.

(1) Turning-on of a power supply

When the operator has turned on a power-supply switch (not shown), the CPU 10 first checks the RAM 12, initializes internal parameters, initializes the respective interface circuits, and clears the liquid-crystal display 32 in accordance with a program stored in the ROM 11. Then, operations of the function keys 34 and the keyboard 7 by the operator are awaited.

(2) Storage of an image index

Then, before reading an image of an original and storing the read image in the magnetooptical disk 38, an image index, serving as a keyboard in image retrieval, is stored in advance in the magnetooptical disk 35. The image index is not an index using code data, such as characters or the like, but is an index using image data. A desired image can be used as the index. An operation of storing the image index is perfomed in the same manner as in an ordinary operation of storing an image of an original.

Figure 12:
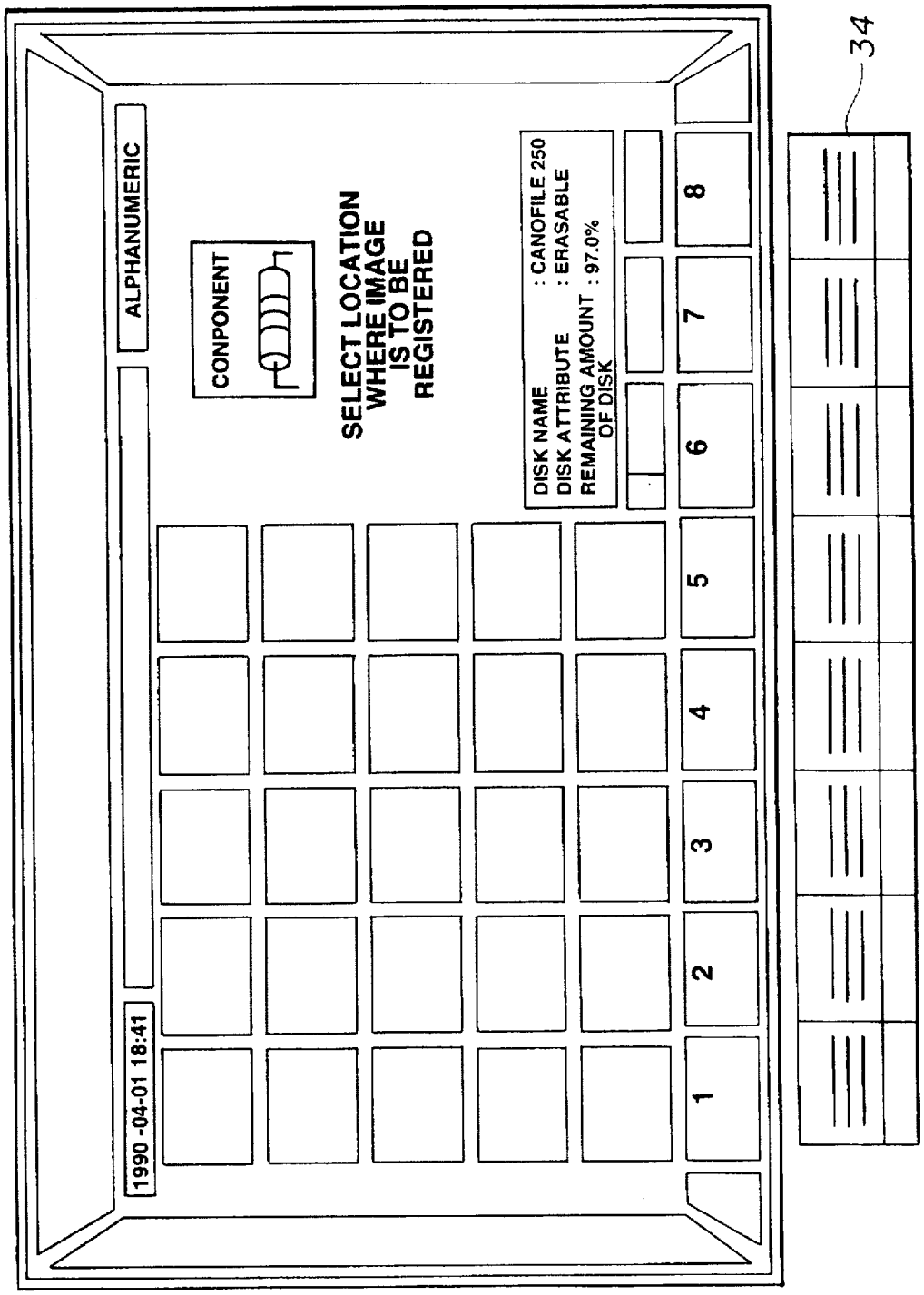
FIG. 12 is a diagram illustrating a display picture surface of a liquid-crystal display when an image index has been read.

FIG. 12 is a front view illustrating a display picture surface of the liquid-crystal display 32 when an image of a "component" has been read as an image index.

Next, the operator assigns the position on the picture surface where the image index is to be registered using the function keys 34.

In FIG. 12, for example, the uppermost position on the leftmost column can be assigned by depressing the leftmost function key (having the character "1") one time, and the third position from above on the second column from the left can be assigned by depressing the second function key from the left (having the character "2") three times.

By alternately repeating reading of an image for an index and assignment of the position where the image is to be registered, a plurality of image indices can be registered.

Figure 13:
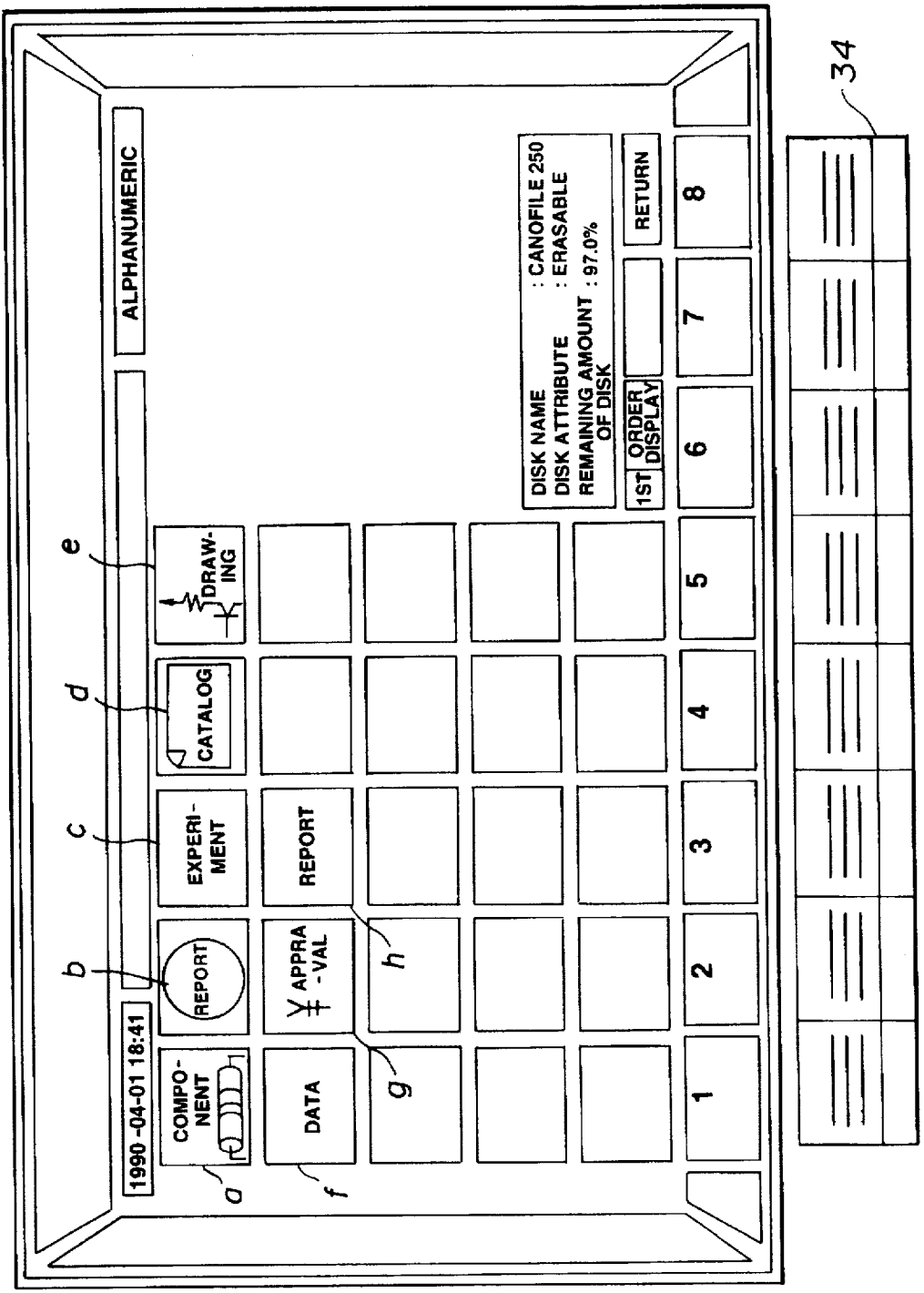
FIG. 13 is a diagram illustrating a picture surface of the liquid-crystal display for selecting an image index.
Figure 14:
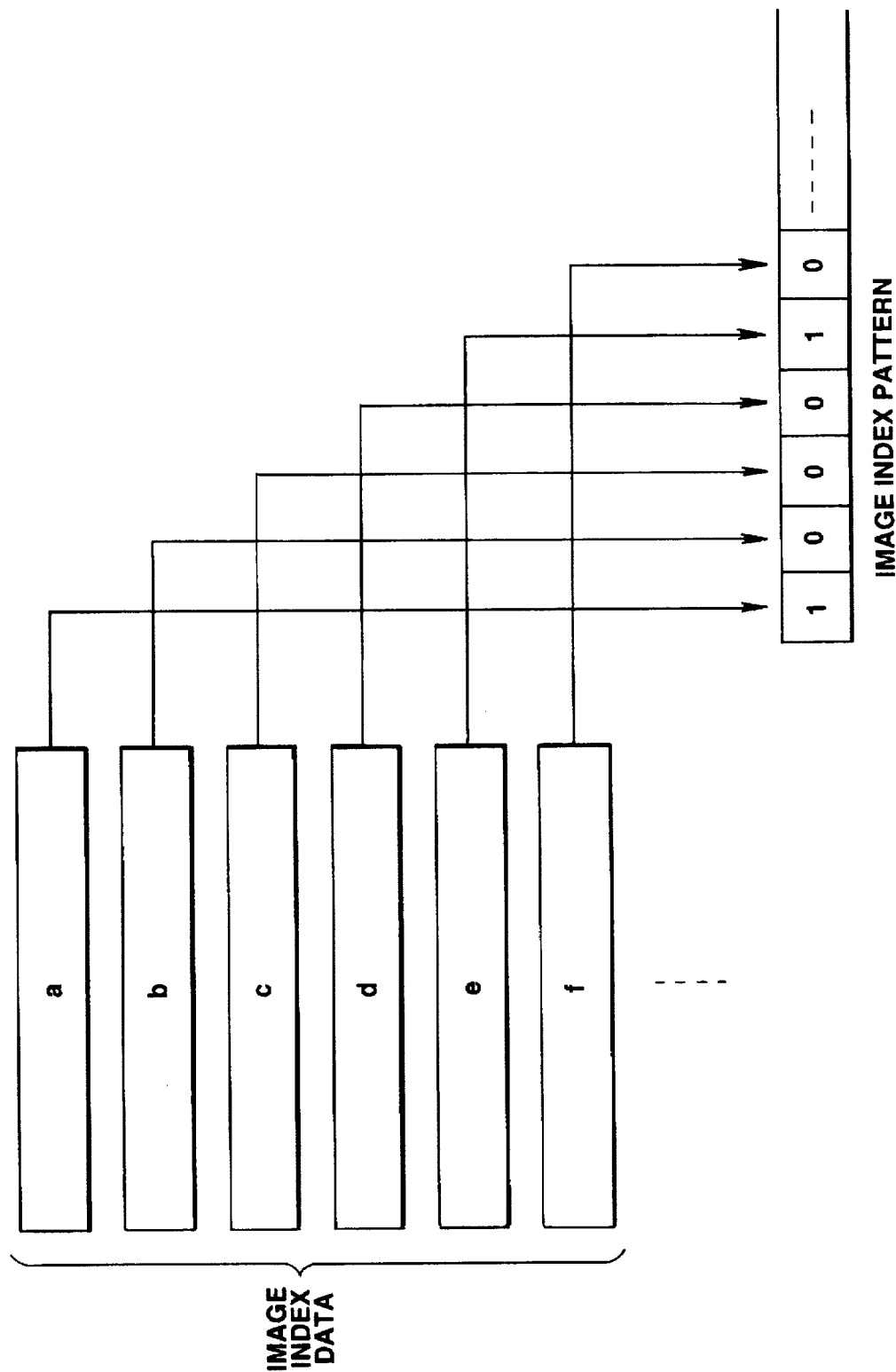
FIG. 14 is a diagram illustrating an image-index data file.

When the image indices have been registered in such a manner, the image-index data file shown in FIG. 14 is generated and stored in the magnetooptical disk (3) Selection of an image index Before reading an image of an original, the image-index-selection screen shown in FIG. 13 is displayed. The operator selects an image index relating to the original to be stored using the function keys 34.

For example, when the operator intends to store the drawing of a component, image indexes a and e may be selected.

As shown in FIG. 14, by selecting the image indices "a" and "e", an image-index pattern having 1's at bit positions corresponding to the selected image indexes is generated.

Instead of image indexes, or together with image indexes, the name or the number of the document to be stored may be input to columns g and h shown in FIG. 13 through the keyboard 7.

The index data set in the above-described manner is held in a predetermined region of the RAM 12 until the image is stored in the following manner.

(4) Reading of the image of the original

Next, the operator performs an operation of reading the original. When the original has an ordinary size (for example, the A4 size), the operator mounts the original 1 on the original mount 2, as shown in FIG. 3, and instructs an ordinary reading operation through the function keys 34. The operator also instructs whether the image on one surface of the original must be read or the images on both surfaces of the original must be read through the function keys 34. The CPU 10 controls the synthesis unit 36 based on this instruction, and selects whether image data from both of the CCD's 111a and 111b must be used or image data from one of the CCD's 111a and 111b must be used.

When the original has a large size (for example, the A3 size) which cannot be mounted on the original mount 2 as it is, the operator folds the original into the A4 size, as shown in FIG. 4, mounts the folded original on the original mount 2, and instructs a large-size reading mode through the function keys 34. In this case, the synthesis unit 38 performs basically the same operation as in the case of reading both surfaces of the original.

In any of the above-described cases, when a reading operation has been instructed by the operator, the CPU 10 controls the driving system 19 via the driving-system interface circuit 18 in accordance with a program stored in the ROM 11.

The operation of the large-size reading mode will now be described.

First, the feeding roller 102 is rotated in the direction of the arrow shown in FIG. 2 by a motor (not shown) to feed the original 1. The original 1 is then fed to a reading position by the conveying rollers 105a and 108b. The images of the original illuminated by the illuminating lamps 108a and 108b are reduced by the lenses 110a and 110b after passing through the mirrors 107a, 108b and 109a, and mirrors 107b, 108b and 109b, and are imaged onto and read by the CCD's 111a and 111b, respectively.

Image signals representing the read images are amplified by the amplifiers 20a and 20b. The amplified image signals are serially synthesized by the synthesis unit 36 for every main scanning operation of the CCD's 111a and 111b. The obtained synthesized signal is digitized by the A/D converter 21, is subjected to edge emphasis processing, density adjustment and contrast adjustment by the image processing unit 22, and is converted into a binary image signal by the binary-coding circuit 23. The converted signal is stored in the image synthesis memory 39.

The synthesis unit 36 has the function of alternately passing data for one main scanning operation from the CCD 111a and data for one main scanning operation from the CCD 111b to the following stage by switching incorporated switching devices.

Accordingly, the image signal from the CCD 111a and the image signal from the CCD 111b are serially connected in units of a line.

In order to prevent transmission of the image of the surface to the back and to detect edges of the original, the surfaces of the original-backup members 114a and 114b have a particular color, such as black or the like, or are subjected to mirror finish, and reading positions of channel A and channel B are shifted by about 16 mm.

The CCD's 111a and 111b are controlled so as to perform a reading operation for a period longer than the length of the original detected by the original sensor 120.

Accordingly, as shown in FIG. 5, the read images of the original stored in the image synthesis memory 39 are in state in which each of the right and left images is surrounded by a black frame, and the images are shifted with each other in the vertical direction. In the image synthesis memory 39, a bit "1" corresponds to black and a bit "0" corresponds to white.

The original whose images have been read is conveyed the conveying belts 116a and 116b, and is discharged onto the sheet-discharging tray 113 by the sheet-discharging rollers 112a and 112b.

When an ordinary operation of reading both surfaces has been instructed, the following synthesis of images is not performed, but read images are stored.

(5) Synthesis of images

FIGS. 6 through 10 are flowcharts illustrating procedures of image synthesis in the first embodiment. The image synthesis processing is performed by the control of the CPU based on a program stored in the ROM 11.

Figure 6:
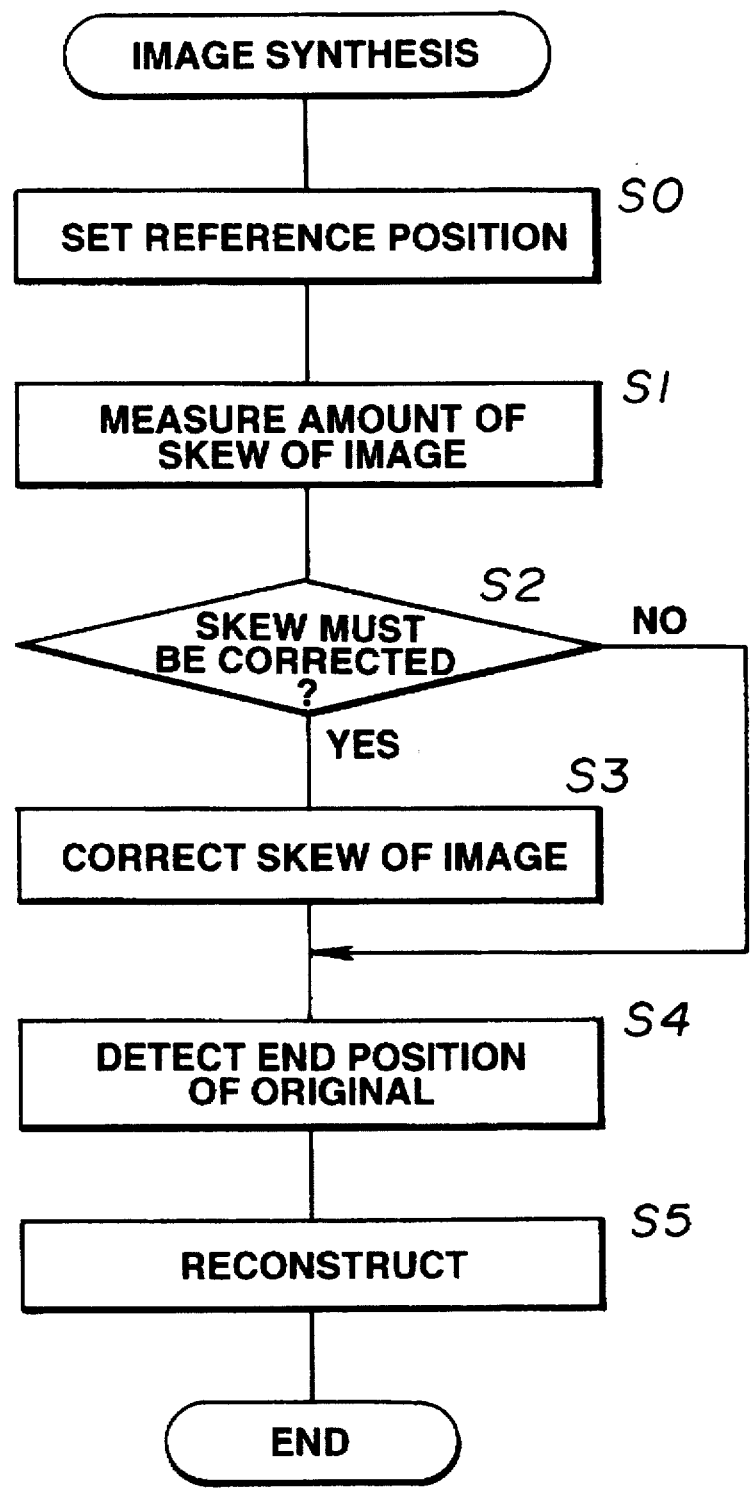
FIG. 6 is a flowchart illustrating an outline of image synthesis processing.

First, an outline of the image synthesis will be described with reference to FIG. 6.

First, in order to synthesize right and left images stored in the image synthesis memory 39, a reference position for synthesizing the images to the center is set, as shown in FIG. 5 (step S0).

Next, the amount of skew of each of the read images is measured by a method which will be described later (step S1). If the measured amount of the skew is within the range "a" shown in FIG. 28 (for example, between −0.2 degrees and +0.2 degrees) in step S2, the process proceeds to step S4 without correcting the skew. If the amount of the skew is outside the range "a", the process proceeds to step If the measured amount of the skew exceeds the range b shown in FIG. 28 (for example, between −5 degrees and +5 degrees), the operator may be notified of the abnormality. When the amount of the skew is equal to or greater than a predetermined value, the skew of the right and left images is corrected in step S3, and the process then proceeds to step S4.

In step S4, in order to synthesize the images, an end position of the original is detected. In step S5, the image is reconstructed based on the result of the detection in step S4.

Figure 7:
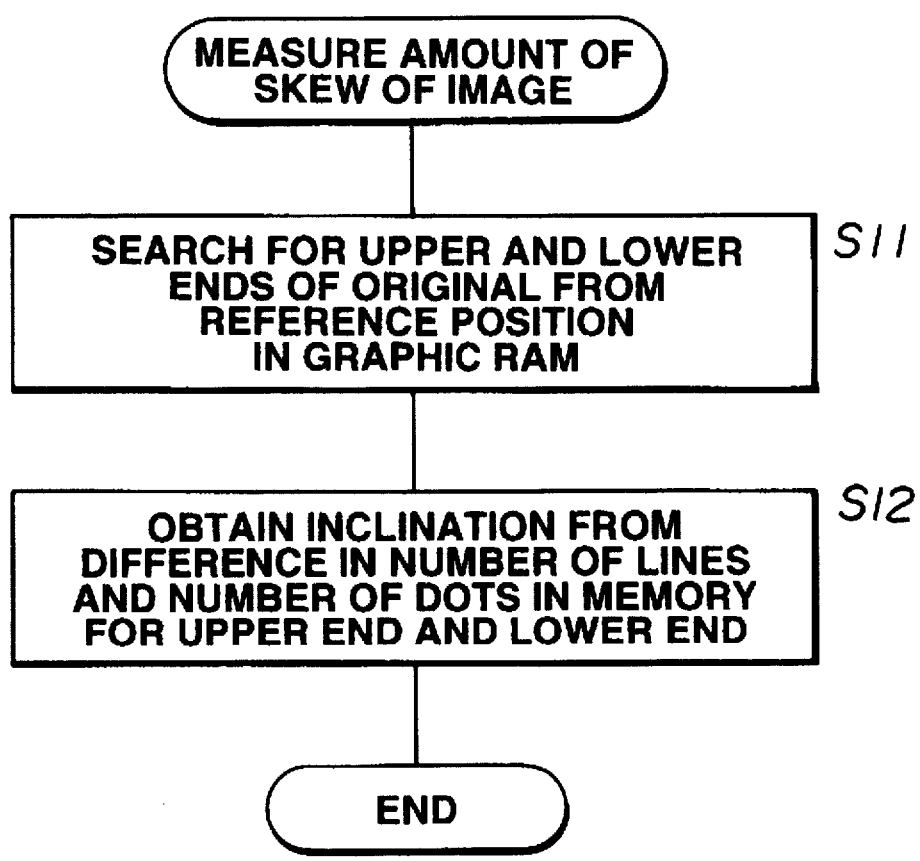
FIG. 7 is a flowchart illustrating procedures of measuring an amount of skew of an image.

Next, a description will be provided of procedures of measuring the amount of the skew of the image performed in the above-described step S1 with reference to FIG. 7.

First, the distance from the reference position to a position where the pixel changes from black to white and white pixels continue for a predetermined number of bits is searched for each horizontal line in images stored in the image synthesis memory 39. The first position where the distance for each line is determined (i.e., the position where white pixels continue for the predetermined number of bits) is determined to be an upper end, and the last position where the distance for each line is determined (i.e., the position where black pixels continue for the predetermined number of bits) is determined to be a lower line (step S11).

Figure 27:
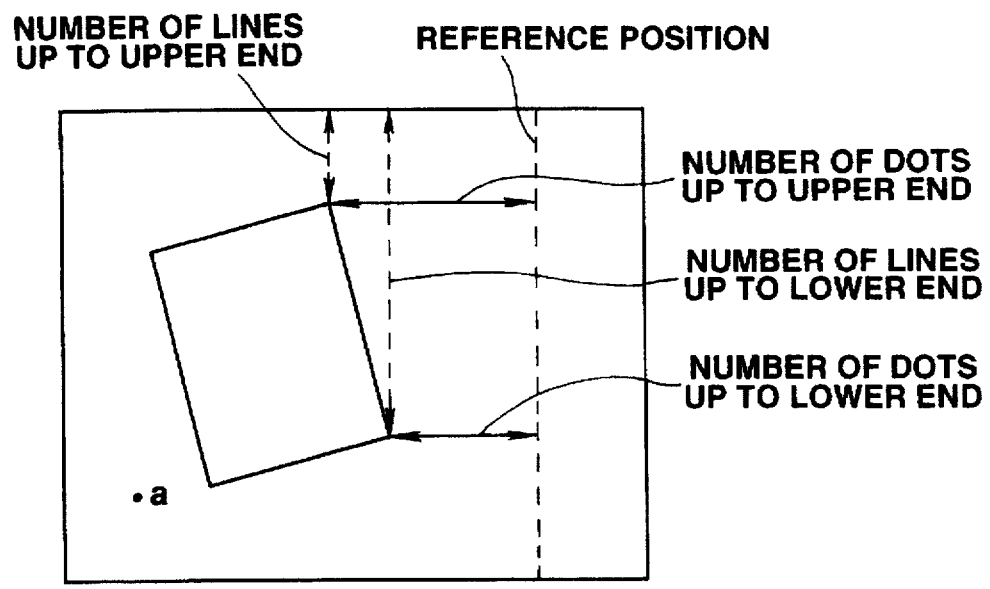
FIGS. 27 and 28 are diagrams illustrating a method of measuring an amount of skew of an image.

The positions where black pixels and white pixels continue for the predetermined number of bits are determined to be the upper end and the lower end, respectively, in order to prevent an erroneous point, such as a point "a" shown in FIG. 27, of the original from being determined to be an upper end or a lower end when the original moves in an oblique direction while it is read.

As shown in FIG. 27, the amount of skew (inclination) of the image of the original is obtained from the x-y positions of the upper end and the lower end (i.e., from the number of dots from the reference position and the number of lines from the upper end of the memory for each of the upper end and the lower end) (step S12).

Figure 8:
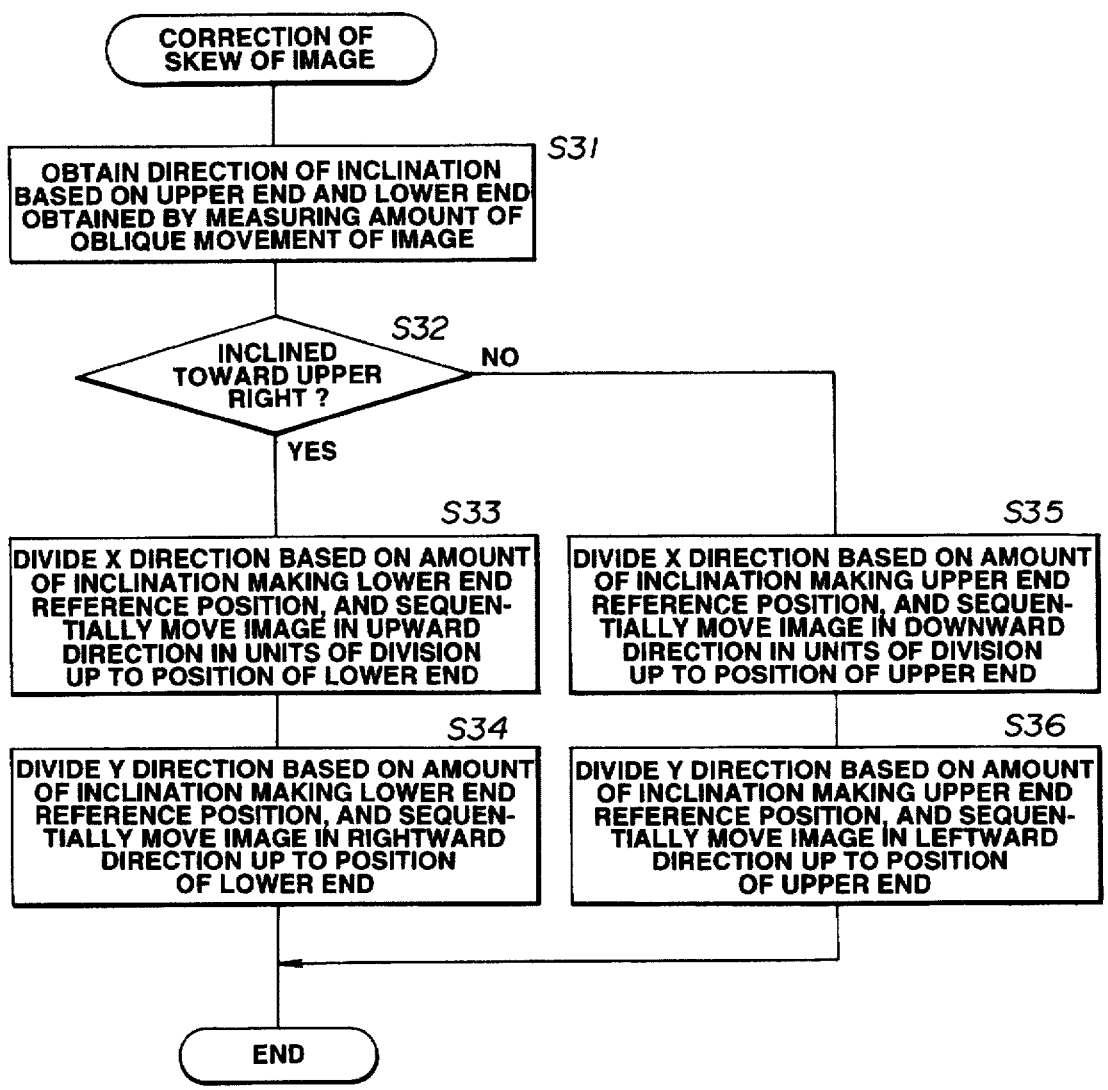
FIG. 8 is a flowchart illustrating procedures of correcting skew of an image.

Next, a description will be provided of procedures of correcting skew of the image shown in the above-described step S3 with reference to FIG. 8.

First, the direction of the inclination is obtained from the upper end and the lower end obtained in the above-described step S11 (step S31). In the case of inclination toward the upper right as a result of determination in step S32, the step proceeds to step S33. In the case of inclination toward the upper left, the process proceeds to step S35.

Figure 29:
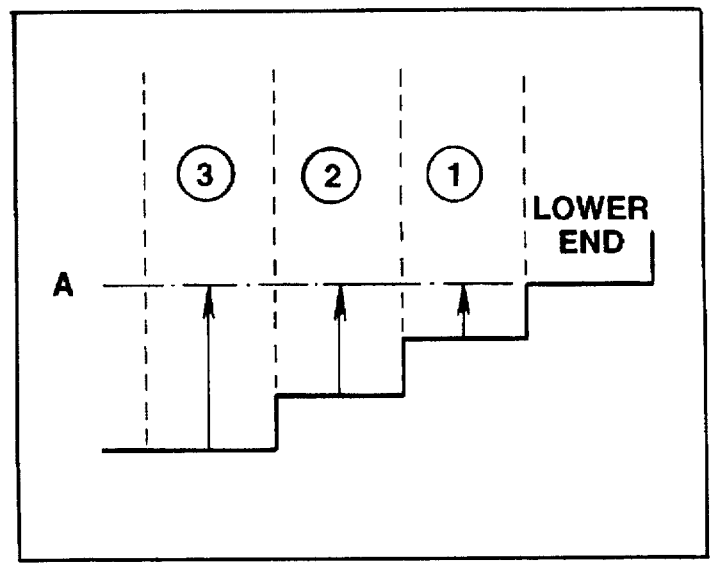
FIGS. 29 and 30 are diagrams illustrating a method of correcting skew of an image.

In step S33, as shown in FIG. 29, the x direction is divided as indicated by ①, ② and ③ based on the number of dots corresponding to the value of the inclination by making the lower end A as a reference position (the average number of dots necessary for shifting by one line), and the image is sequentially moved upward in units of the division up to the position of the lower end A (step S33).

Figure 30:
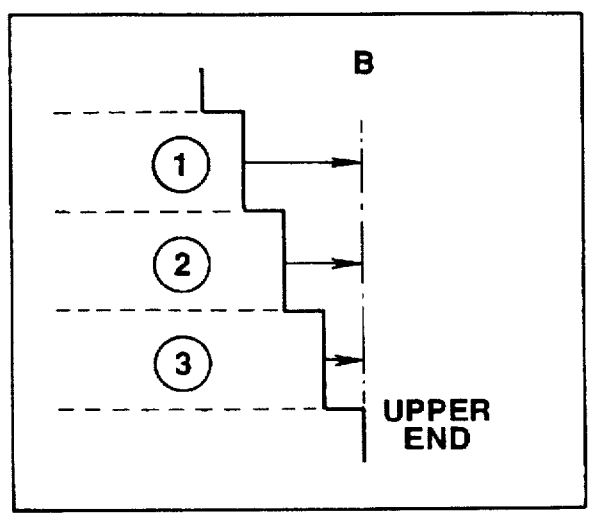

Then, as shown in FIG. 30, the y direction is divided as indicated by ①, ② and ③ based on the number of lines corresponding to the value of the inclination by making the lower end B as a reference position (the average number of lines necessary for shifting by one dot), and the image is sequentially moved rightward up to the position of the lower end in units of the division (step S34).

In steps S35 and S36, the same image moving operation as that performed in the above-described steps S33 and S34 is performed by making the upper end as a reference position.

Although in the present embodiment the image moving operation is performed by making the lower end as a reference position in the case of inclination toward the upper right, and the image moving operation is performed by making the upper end as a reference position in the case of inclination toward the upper left, the image moving operation may be performed by making the upper end as a reference position in the case of inclination toward the upper right, and the image moving operation may be performed by making the lower end as a reference position in the case of inclination toward the upper left.

Figure 9:
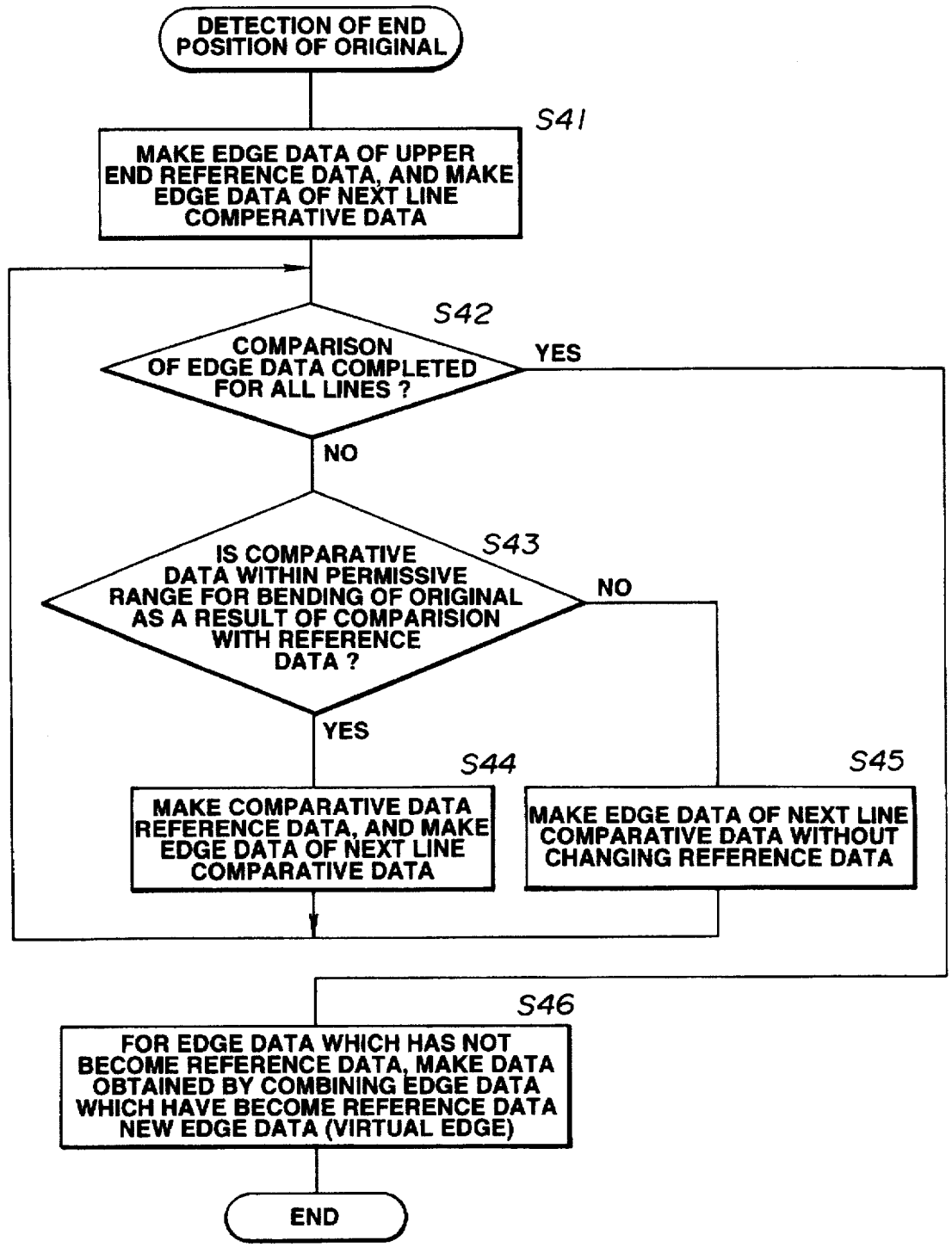
FIG. 9 is a flowchart illustrating procedures of detecting an end position of an image.

Next, a description will be provided of procedures of detecting the end position of the original shown in the above-described step S4 with reference to FIG. 9.

Figure 31:
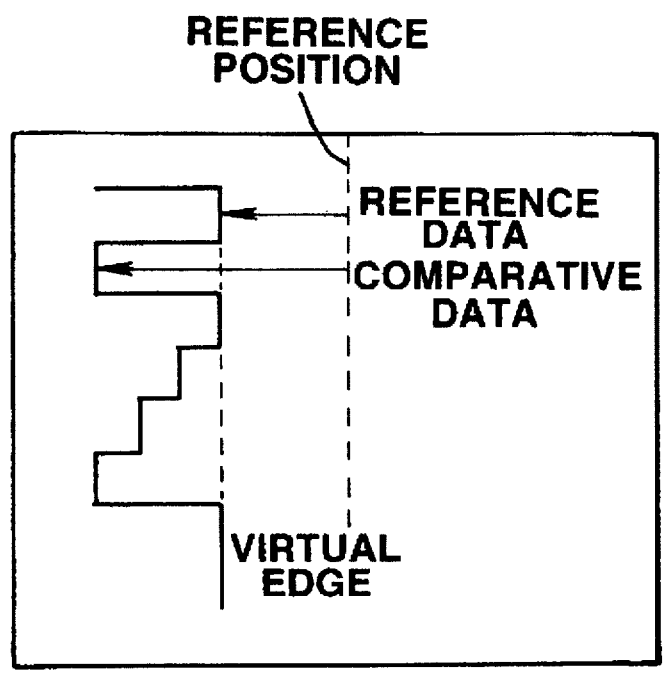
FIG. 31 is a diagram illustrating detection of an end position of an original.

First, as shown in FIG. 31, respective edge data are compared with each other by making edge data of the upper end as a reference data and by making edge data of the next line as a comparative data (step S41).

The edge data is represented by the distance to the first white pixel which can be estimated to be a part of the image as a result of search starting from the reference position. In general, the edge data is the first white pixel, but in some cases, the edge data is not always the first white pixel when noise is included in the image data and a filter for removing noise is provided.

The reference data is edge data which can be considered to correspond to the end position of the original. The comparative data is edge data to be compared with the reference data in order to determine if the comparative data corresponds to the end position of the original. Edge data of respective lines sequentially become comparative data.

Then, it is determined if comparison of edge data has been completed for all lines from the upper end to the lower end of the image (step S42). If the result of the determination is negative, the process proceeds to step S43, where it is determined if the comparative data is within the permissive range for the amount of bending of the original as a result of comparison with the reference data.

The amount of bending of the original is the amount of bending of the end position of the original caused by fluctuation of the original in the direction of the optical axis while the original is conveyed. That is, the position of the edge of the original imaged onto the CCD shifts due to the deviation of the original in the direction of the optical axis. For example, when the distance between reference data and comparative data (the number of lines) equals between 1 and 10, the permissive amount of the bending (the number of dots) equals 1. Similarly, when the distance equals between 11 and 20, 21 and 50, and 51 and 100, the permissive amount equals 2, 3 and 4, respectively.

If the result of the determination in step S43 is affirmative, the process proceeds to step S44, where comparison is performed by making the current comparative data as a reference data and by making the next edge data as a comparative data. If the result of the determination in step S43 is negative, the process proceeds to step S45, where comparison is performed by making edge data of the line next to the compared line as a comparative data without changing the reference data.

If the result of the determination in step S42 is affirmative, for edge data of the line which has not become reference data, data obtained by combining edge data of adjacent lines which have become reference data is made new edge data representing a virtual edge. This virtual edge is made to be the end position of the original.

Although a description has been provided of the processing for the image at the left in FIG. 5, the same processing is performed for the image at the right.

Figure 10:
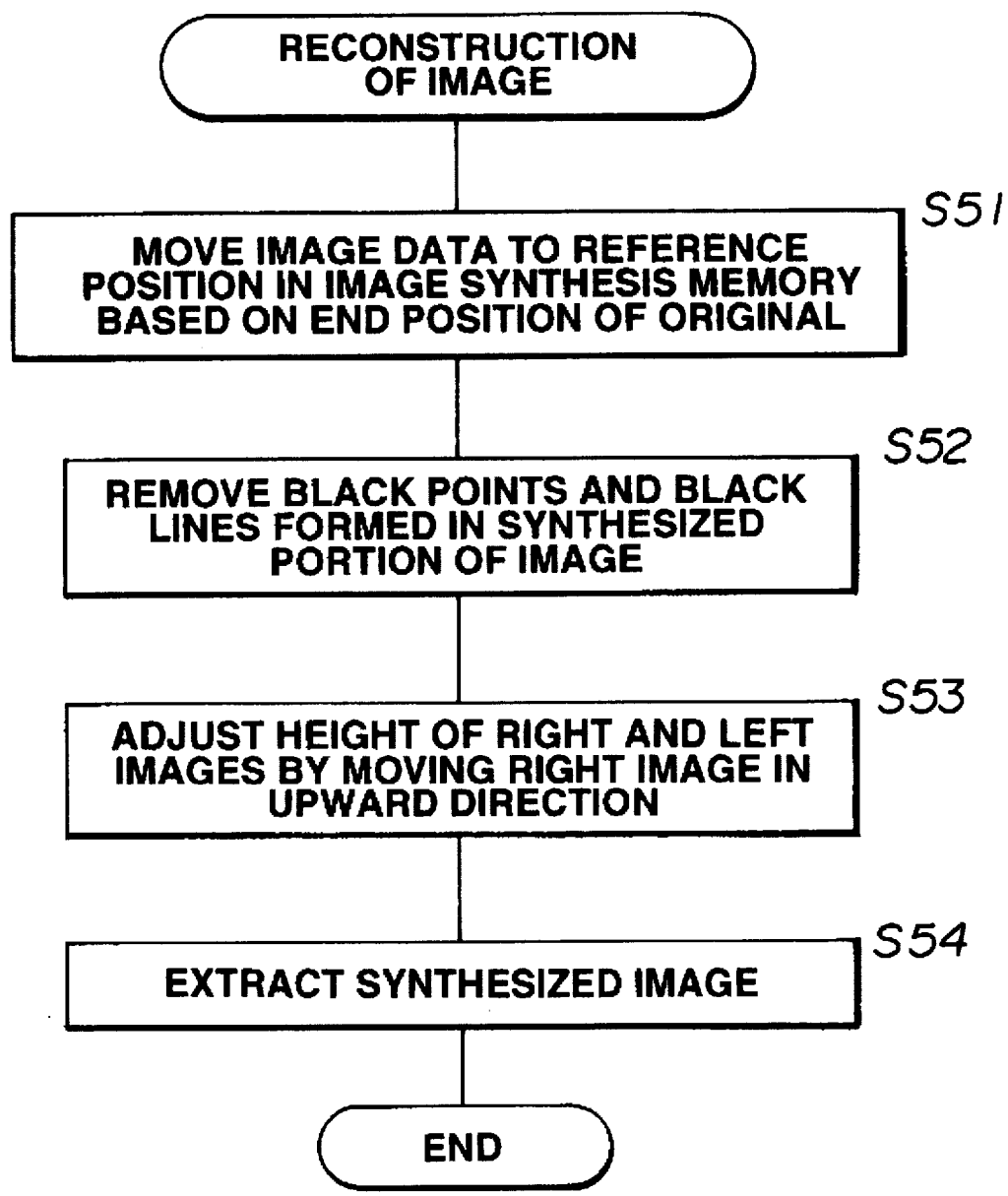
FIG. 10 is a flowchart illustrating procedures of reconstructing an image.

Next, a description will be provided of procedures of reconstructing the image shown in the above-described step S5 with reference to FIG. 10.

First, in step S51, as shown in (A) of FIG. 33, the images stored in the image synthesis memory 38 are moved to the reference position for respective lines based on the end position of the original obtained by the above-described detection of the end position of the original, and the image of the original is reconstructed.

Figure 32A:
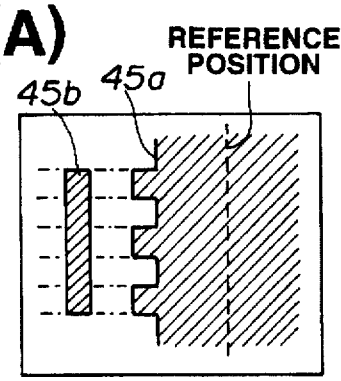
FIGS. 32(A), 32(B), 32(C), and 32(D) are diagrams illustrating a method of removing black points and black lines produced during image synthesis.

While moving the image, as shown in FIG. 32(A), projections and recesses are, in some cases, present at the end position (45a) of the original although characters and figures of the original are not distorted. This is caused by errors produced during a reading operation by the CCD. If image data is moved in this state based on the end position (48c) of the original, characters and figures which are originally not distorted distort, as indicated by 45d in FIG. 32(d).

Figure 32D:
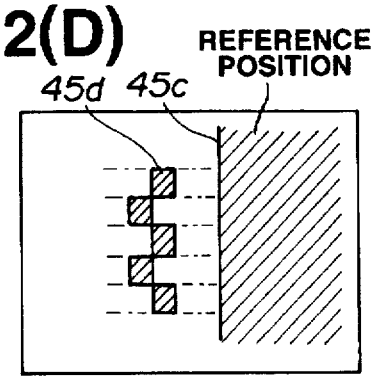
Figure 32B:
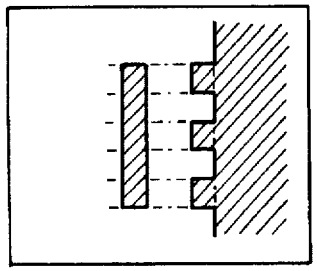

Accordingly, as for small projections and recesses in image end data, processing of moving the image data based on the position closer to the reference position (at the side of projections) (smoothing processing) is added. Thus, as shown in FIG. 32(B), the image can be reconstructed without producing distortion in characters and figures.

Figure 32C:
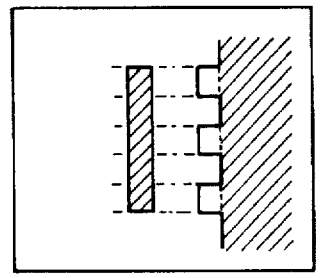

When smoothing processing of the image has been performed, black points and black lines are generated in a synthesized portion of the image. Hence, in step S82, the bits of the black points and the black lines generated in the smoothing processing are inverted. Thus, as shown in FIG. 32(C), image synthesis can be performed without producing distortion in characters and figures and without leaving black points and black lines in the synthesized portion of the image.

Thereafter, in step S53, the image at the right side is moved upward by a distance corresponding to the amount of deviation in the reading position between channel A and channel B to adjust the heights of the images at the right and left sides. At that time, the amount of movement may be finely adjusted based on the correlation between the right and left images.

Then, in step S54, the region of the original of the synthesized image is extracted to provide image data. According to this processing, the amount of image data can be reduced.

According to the above-described procedures, the reconstruction of the image of a folded large-size original is realized. In the above-described processing, necessary temporary data, data of the result of the processing, and the like are stored in predetermined regions of the RAM 12.

(6) Recording of the image

The read large-size image is compressed by the compression unit 24 using an image compression method, such as MH (modified Huffman), MR (modified read), MMR (modified modified read) or the like, and is then stored in one of the compressed-data buffers 33a and 33b. The stored compressed image data and the above-described index data for retrievel are transmitted to the magnetooptical-disk storage device 115 via the disk interface circuit 27, and are written in the magnetooptical disk 35.

The index data for retrieval is recorded in the magnetooptical disk 38 so as to be correlated to the corresponding image or document.

For example, in the above-described case of the "component drawing", a record including the image-index pattern "100010..." the document name "component drawing" the document number "150" and the like is generated in the second row of FIG. 15. The "page file pointer" indicates the number of the row of the page control file (shown in FIG. 16) to which the first page of the document file corresponds.

Information relating to each page of a stored document is stored in the page control file shown in FIG. 16. The "page file pointer" at the right of the document control file shown in FIG. 15 indicates the record number of the page control file to which the first page of the stored document corresponds.

The record relating to the page also stores information indicating whether the image has been read, for example, in a two-face mode, in a one-face mode, or in a large-size reading mode.

In the present embodiment, the position on the magnetooptical disk 35 where image data, i.e., the above-described compressed image data, is recorded is controlled by storing the node table shown in FIG. 17 in the magnetooptical disk 35.

Each record of the node table includes a FAT (file allocation table) entry (62B0 for the above-described data) indicating the position of the FAT for the compressed-image file of the page, and the size (the number of bytes) of the compressed image data. The number of the record of the node table is termed a "node number", which is stored for each page in the page control file shown in FIG. 16.

The operation of storing the image of the original is completed by writting the compressed image data in the magnetooptical disk 35, and adding corresponding records in the node table, the page control file and the document control file.

(7) Retrieval of an image

When the operator has assigned retrieval through the function keys 34, a picture substantially the same as that shown in FIG. 13 is displayed on the display 32, and the operator performs selection of an image index through the function keys 34, assignment of a document name and a document number through the keyboard 7, and the like.

Then, the CPU 10 checks each record of the document control file, and selects a record which coincides with the selected or input image-index pattern, and the document name or the document number.

If the selected image index comprises, for example, only the image index a including the character and the image of the "component" shown in FIG. 13, since the image index e including the character and the image of the "drawing" is not selected, the image-index pattern differs from that shown in FIG. 14 such that the bit corresponding to the image index e equals 0.

However, when checking records of the document control file shown in FIG. 15, each record including an image-index pattern in which bit "1" is present at the same bit position where bit "1" is present in the image-index pattern input during the retrieval is selected. Hence, in the above-described case, the "component catalog" in the first row, the "component drawing" in the second row, and the "component drawing" in the fourth row of FIG. 15 are selected.

When a plurality of documents have been retrieved as in the above-described case, the operator selects one of the documents using the keyboard 7.

When one document has been finally selected, the record of the first page of the document is selected from the page control file shown in FIG. 16 by the page file pointer of that record. By speficying the node number, the FAT entry of the first page is obtained from the node table.

Figures 18, 19:
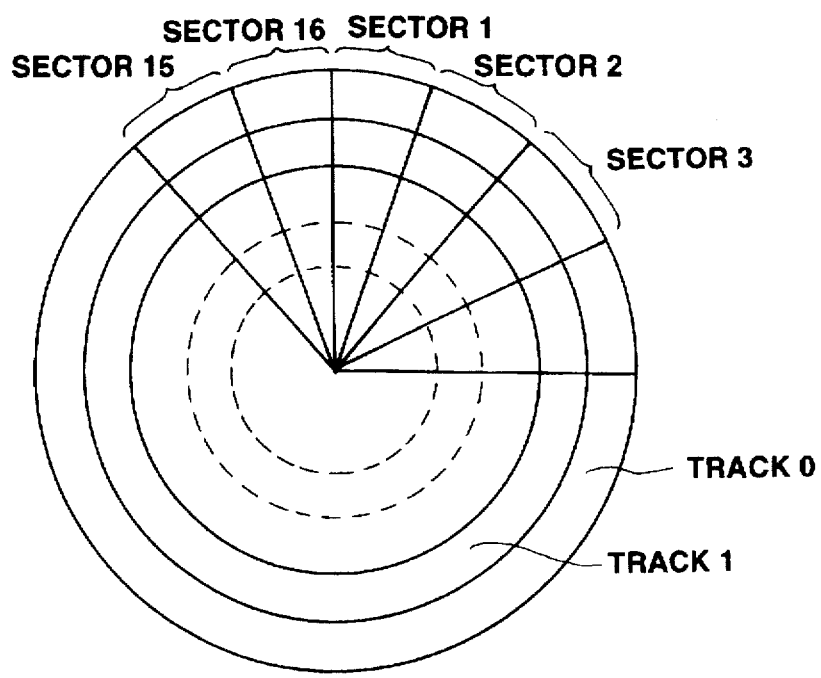
FIG. 18 is a diagram illustrating storage regions of a magnetooptical disk.
FIG. 19 is a diagram illustrating a logical address table.

By following the above-described FAT, a logical-address string is obtained. After specifying desired compressed image data in the magnetooptical disk 35, the CPU 10 controls the disk interface 27 in order to read compressed image data from the magnetooptical-disk storage device 115. FIG. 18 is a diagram illustrating storage regions of the magnetooptical disk 35. FIG. 19 is a diagram illustrating a logical-address table used in the present embodiment. Compressed image data is read from the corresponding storage region of the magnetooptical disk 35 using such a logical-address table.

At that time, the CPU 10 also controls the disk controller 26 so as to transmit compressed image data from the disk interface 27 to the expansion unit 25. The output data flow controller 50 is controlled by the CPU 10 so as to store image data from the expansion unit 25 in the graphic RAM 13 and to display the data on the display 32.

Thus, compressed image data stored in the magnetooptical disk 35 is read and displayed.

Although in the above-described first embodiment image synthesis is performed while image data is stored, image synthesis may not be performed while image data is stored, but may be performed in the graphic RAM 13 in the above-described manner when displaying the image data during retrieval.

Although in the above-described first embodiment the synthesized image is stored in the magnetooptical disk the synthesized image may be transmitted to the communication apparatus 38 via the communication interface circuit and the communication network As described above, according to the first embodiment, a large-size original can be read by utilizing the function of reading two faces, whereby a low-price and high-performance apparatus can be realized.

Next, a description will be provided of a second embodiment of the present invention.

Figure 21:
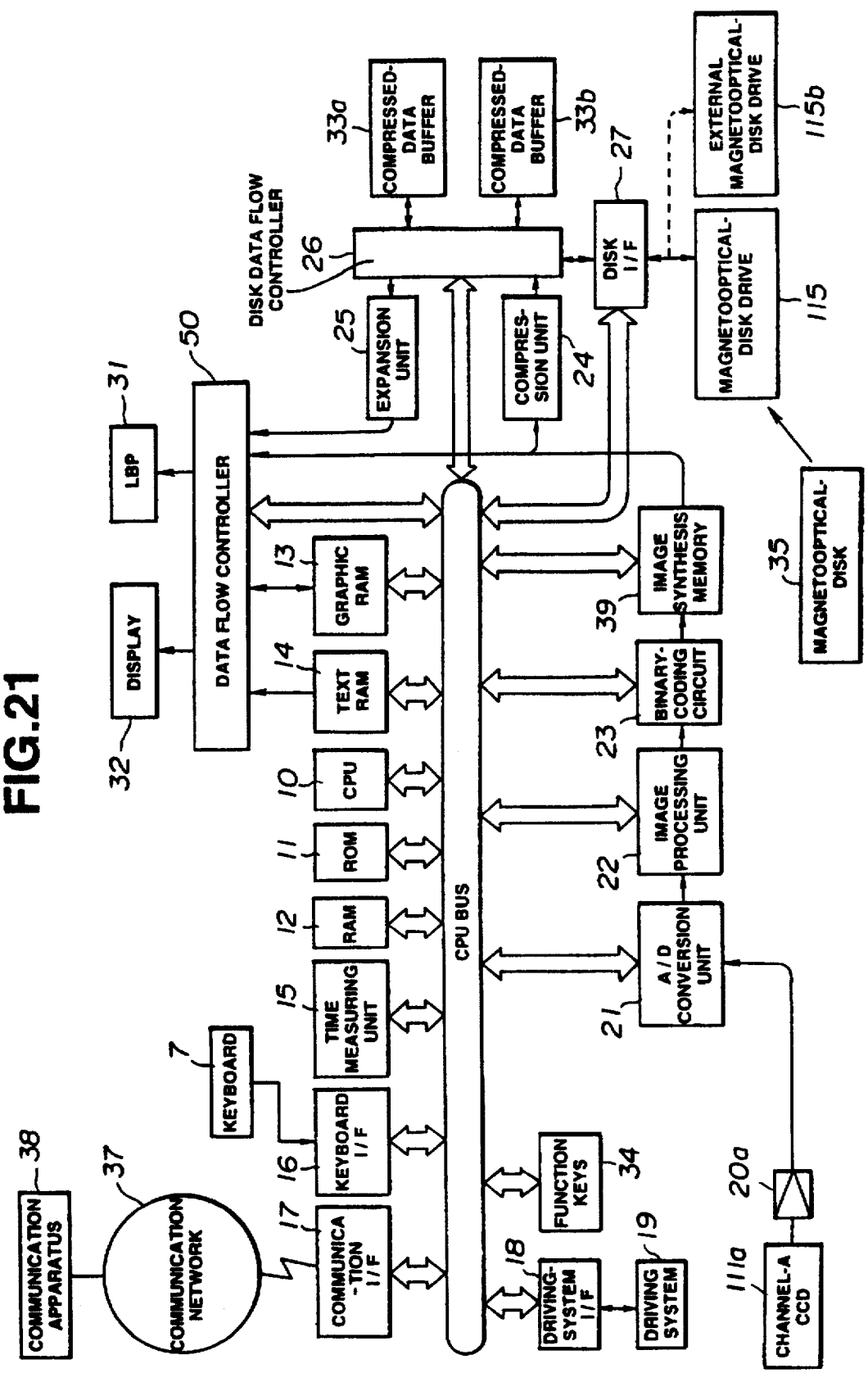
FIG. 21 is a block diagram illustrating the configuration of circuitry of an image filing apparatus according to the second embodiment.

FIG. 21 is a block diagram illustrating the configuration of circuitry of an image filing apparatus according to the second embodiment.

The configuration of the apparatus of the second embodiment differs from that of the first embodiment shown in FIG. 1 in that while the apparatus of the first embodiment includes the two CCD's 111a and 111b and the two amplifiers 20a and 20b, and the synthesis unit 36 for synthesizing image data from these units, the apparatus of the second embodiment includes only a single CCD 111a and a single amplifier 20a, and omits the synthesis unit Since other components are the same as those of the first embodiment, the same reference numerals are provided for the same components, and a description thereof will be omitted.

Figure 22:
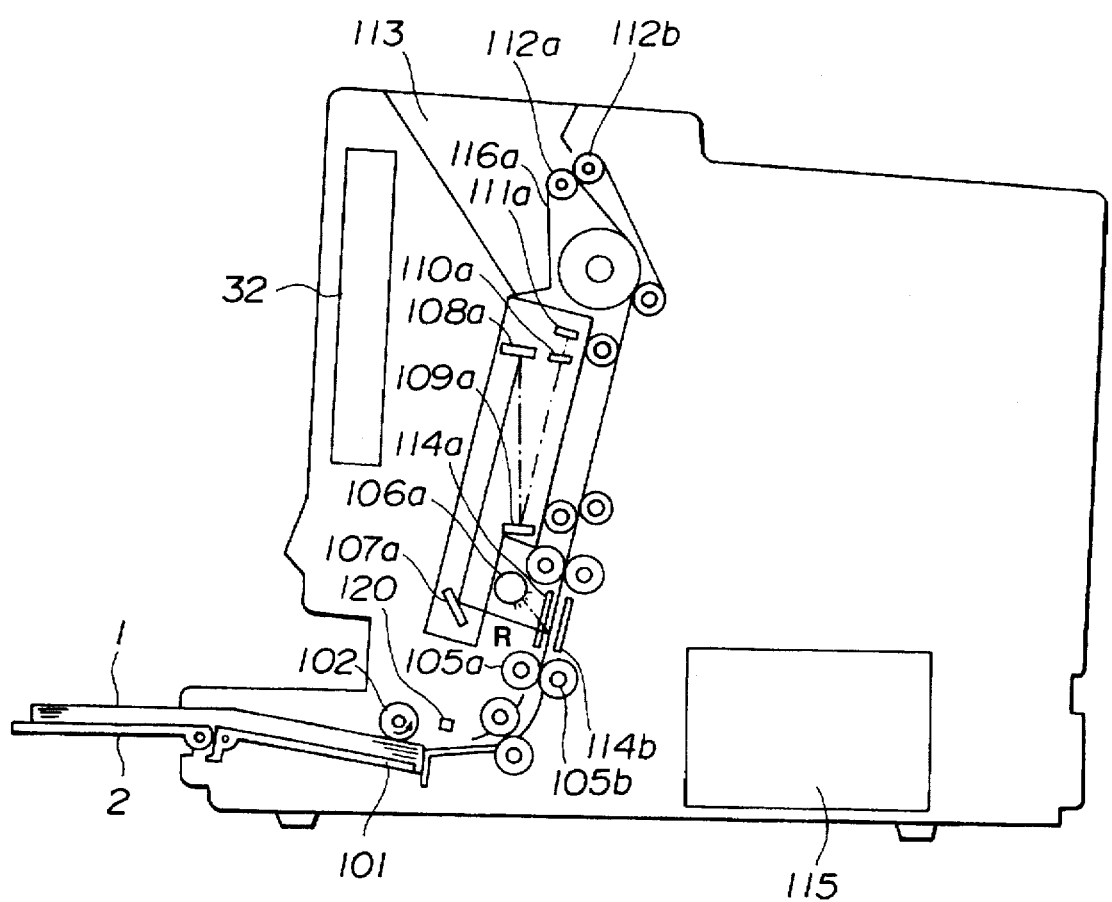
FIG. 22 is a cross-sectional view illustrating the internal structure of the image filing apparatus of the second embodiment.

FIG. 22 is a schematic cross-sectional view illustrating the internal structure of the image filing apparatus of the second embodiment.

As shown in FIG. 22, since the CCD 111b is omitted, the fluorescent lamp 108b for illuminating the original, the mirrors 107b, 108b and 109b, and the lens 110b are omitted. Since other components are the same as those of the first embodiment, the same reference numbers are provided, and a description thereof will be omitted.

Next, a description will be provided of operation procedures in the second embodiment in the sequence of (1) reading of an image of an original and (2) synthesis of the image. Since turning-on of a power supply, storage of an image index, selection of an image index, storage of an image, and retrieval of an image are the same as in the case of the first embodiment, a description thereof will be omitted.

(1) Reading of the image of the original

When the original has an ordinary size (for example, the A4 size), the original 1 is mounted on the original mount 2, as shown in FIG. 3, and an ordinary reading operation is instructed through the function keys 34.

When the original has a large size which cannot be mounted on the original mount 2 as it is, the original is folded, or the original is cut, as shown in FIG. 24, and is mounted on the original mount 2, and a large-size reading mode is instructed through the function keys 34.

In any of the above-described cases, when a reading operation has been instructed, the CPU 10 controls the driving system 19 via the driving-system interface circuit 18 in accordance with a program stored in the ROM 11.

The operation of the large-size reading mode will now be described.

Figure 23:
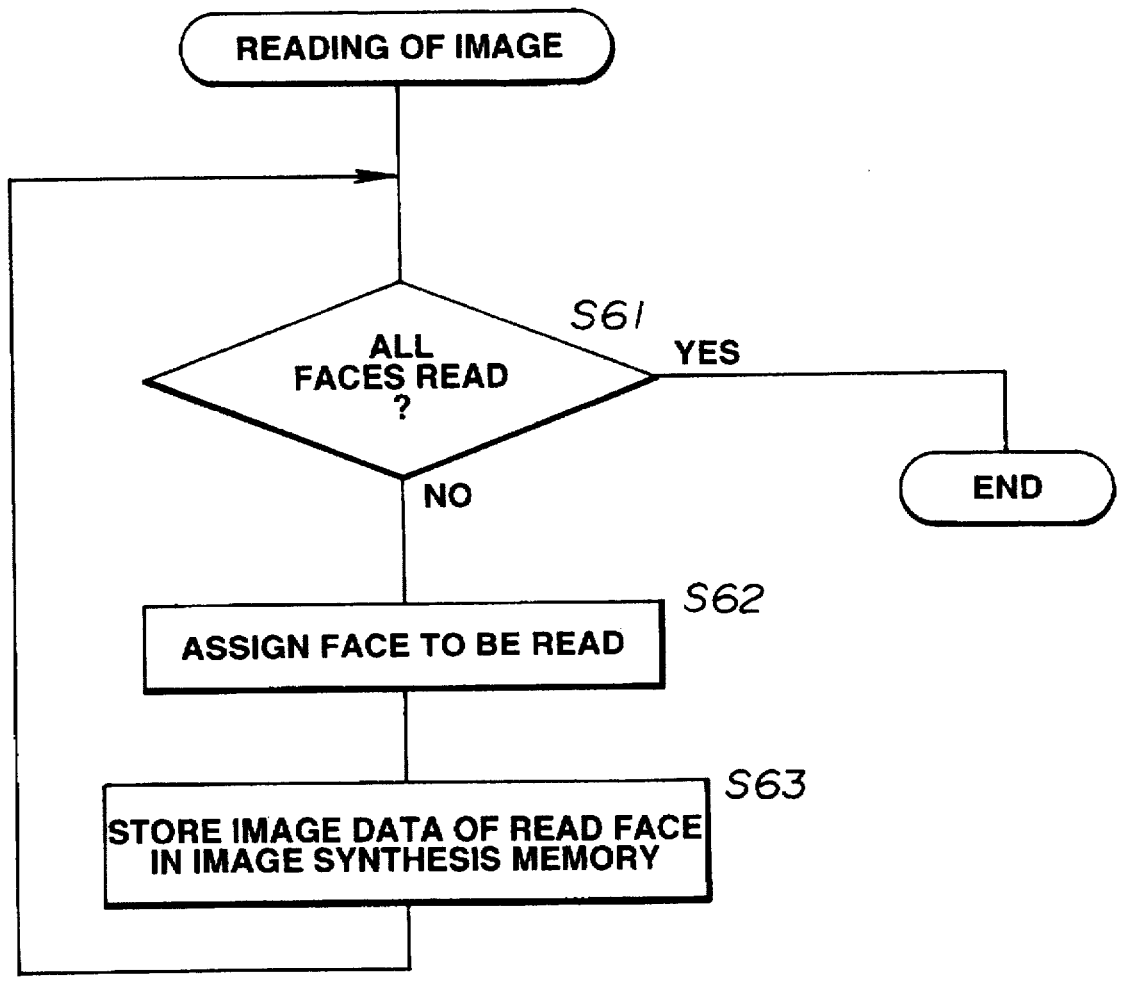
FIG. 23 is a flowchart illustrating an operation of reading images.

FIG. 23 is a flowchart illustrating the reading operation in the large-size reading mode. In this case, when instructing the large-size reading operation, the region of the original to be read (for example, the right side or the left side) is also input through the function keys 34 (step S62). The input data is stored in a predetermined region of the RAM 12.

Then, the reading operation is executed (step S63). First, the feeding roller 102 is rotated in the direction of the arrow shown in FIG. 22 by a motor (not shown) to feed the original 1. The original 1 is then fed to a reading position by the conveying rollers 105a and 105b. The image of the original illuminated by the illuminating lamp 106a is reduced by the lens 110a after passing through the mirrors 107a, 108b and 109a, and is imaged onto and read by the CCD 111a.

An image signal representing the read image is amplified by the amplifier 20a. The amplified image signal is digitized by the A/D converter 21, is subjected to edge emphasis processing, density adjustment and contrast adjustment by the image processing unit 22, and is converted into a binary image signal by the binary-coding circuit 23. The converted signal is stored in the image synthesis memory 39.

At that time, the image data is stored in the image synthesis memory 39 so as to correspond to the read region of the original input through the function keys 34.

In order to prevent transmission of the image of the surface to the back and to detect edges of the original, the surfaces of the original-backup members 114a and 114b provided in the conveying channel have a particular color, such as black or the like, or are subjected to mirror finish.

The CCD 111a is controlled so as to perform a reading operation for a period longer than the length of the original detected by the original sensor 120.

The read original is conveyed by the conveying belts 116a and 116b, and is discharged onto the sheet-discharging tray 113 by the sheet-discharging rollers 112a and 112b.

The above-described operation is performed for each surface of the folded original, or for the left and right images of the cut original. That is, the reading operation is performed twice. After reading the two images, the reading operation is terminated (step S81).

Figure 28:
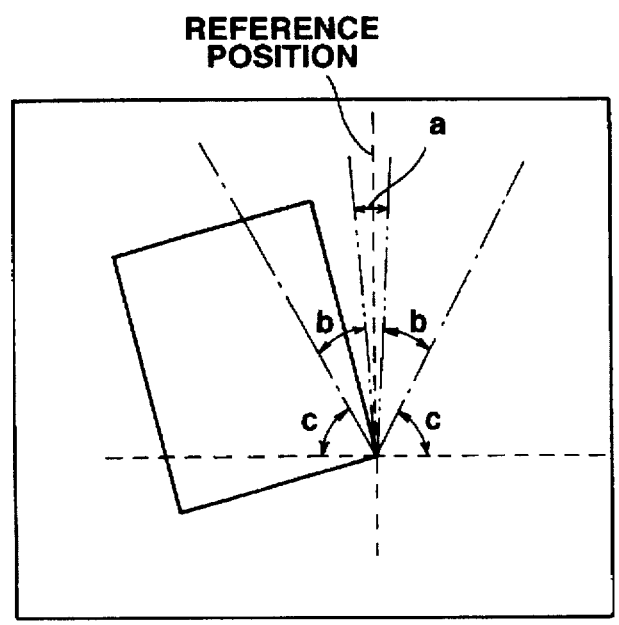

Accordingly, as shown in FIG. 28, the read images of the original are stored in the image synthesis memory 39 in a state in which each of the right and left images is surrounded by a black frame. In the images stored in the image synthesis memory 39, a bit "1" corresponds to black and a bit "0" corresponds to white.

Although in the foregoing description, the left and right images are assigned as the reading regions of the original, the left and right images may be read according to a preset sequence. In the case of a cut original, the left-side original and the right-side original may be continuously fed and read by a single reading instruction.

(2) Synthesis of images

FIGS. 6 through 9 and FIG. 11 are flowcharts illustrating procedures of image synthesis in the second embodiment. The image synthesis processing is performed by the control of the CPU 10 based on a program stored in the ROM 11.

First, an outline of the image synthesis will be described with reference to FIG.

Figure 25:
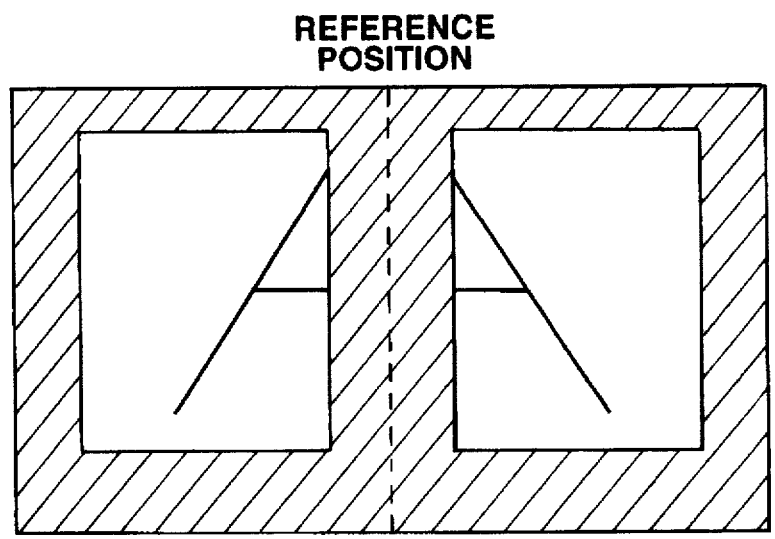
FIG. 25 is a diagram illustrating a state of read image data.

First, in order to synthesize the right and left images stored in the image synthesis memory 39, a reference position for synthesizing the images to the center is set, as shown in FIG. 25 (step S0).

Next, the amount of skew of each of the read images is measured (step S1). If the measured amount of the skew is within the range "a" shown in FIG. 28 (for example, between −0.2 degrees and +0.2 degrees) in step S2, the process proceeds to step S4 without correcting the skew. If the amount of the skew is outside the range "a" the process a proceeds to step S3.

If the measured amount of the skew exceeds the range b shown in FIG. 28 (for example, between −5 degrees and +5 degrees), the operator may be notified of the abnormality.

When the amount of the skew is equal to or greater than a predetermined value, the skew of the images is corrected in step S3, and the process then proceeds to step S4.

In step S4, in order to synthesize the images, an end position of the original is detected. In step S5, the image is reconstructed based on the result of the detection in step S4.

Since the details of the above-described steps S0 through S4 are the same as the procedures described with reference to FIGS. 7 through 9 in the first embodiment, a description thereof will be omitted.

Figure 11:
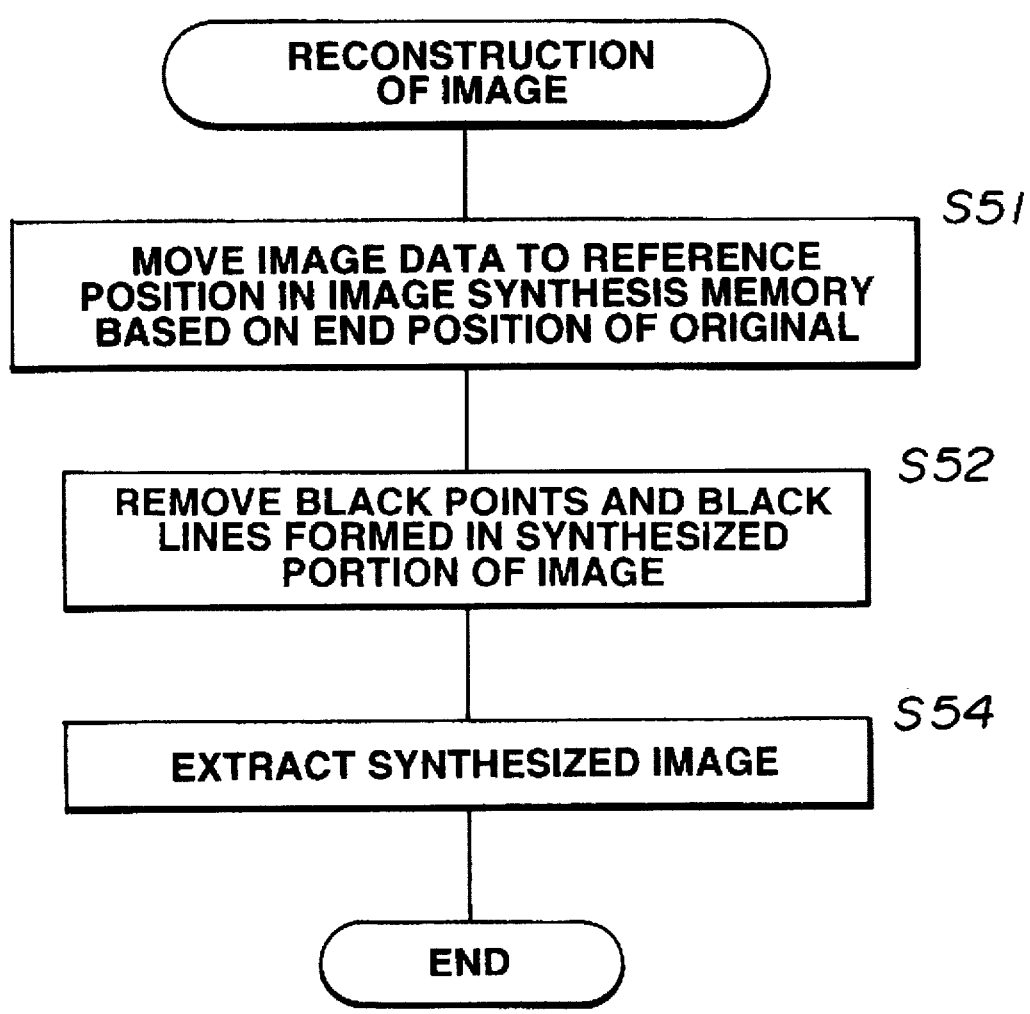
FIG. 11 is a flowchart illustrating procedures of reconstructing an image according to a second embodiment of the present invention.

Next, a description will be provided of procedures of reconstructing the image shown in the above-described step S5 in the second embodiment with reference to FIG. 11.

First, in step S51, as shown in (A) of FIG. 33, the images stored in the image synthesis memory 38 are moved to the reference position for respective lines based on the end position of the original obtained by the above-described detection of the end position of the original, and the image of the original is reconstructed.

While moving the image, as shown in FIG. 32(A), projections and recesses are, in some cases, present at the end position of the original although characters and figures of the original are not distorted. This is caused by errors produced during a reading operation by the CCD. If image data is moved in this state based on the end position of the original, characters and figures which are originally not distorted distort, as shown in FIG. 32(D).

Accordingly, as for small projections and recesses in image end data, processing of moving the image data based on the position closer to the reference position (at the side of projections) (smoothing processing) is added. Thus, as shown in FIG. 32(B), the image can be reconstructed without producing distortion in characters and figures.

When smoothing processing of the image has been performed, black points and black lines are generated in a synthesized portion of the image. Hence, in step S52, the bits of the black points and the black lines generated in the smoothing processing are inverted. Thus, as shown in FIG. 32(C), image synthesis can be performed without producing distortion in characters and figures and without leaving black points and black lines in the synthesized portion of the image.

Then, in step S54, the region of the original of the synthesized image is extracted to provide image data. According to this processing, the amount of image data can be reduced.

According to the above-described procedures, the reconstruction of the image of a folded large-size original or the image of a cut large-size original is realized. In the above-described processing, necessary temporary data, data of the result of the processing, and the like are stored in predetermined regions of the RAM 12.

Figure 26:
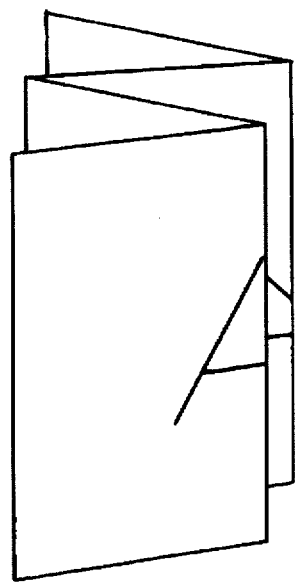
FIG. 26 is a diagram illustrating a state in which a large-size original is folded.

Although a description has been provided of the second embodiment of the present invention, the present invention is not limited to the above-described operation of reading left and right regions obtained by dividing an image of an original. For example, as shown in FIG. 26, the image of the original may be divided into a larger number of regions, and images of respective divided regions may be read and stored in the image synthesis memory 39 while controlling the read images so as to correspond to each other, and the stored images may be synthesized.

Although in the above-described second embodiment image synthesis is performed while image data is stored, image synthesis may not be performed while image data is stored, but may be performed in the graphic RAM 13 when displaying the image data during retrieval.

Although in the above-described second embodiment the synthesized image is stored in the magnetooptical disk 35, the synthesized image may be transmitted to the communication apparatus 38 via the communication interface circuit 17 and the communication network 37.

As described above, since an image of an original whose size is greater than the reading width of a scanner can be easily read by dividing the image into a plurality of regions, and read images can be synthesized to reconstruct the image. Accordingly, it is possible to reduce the size and the cost of the apparatus, and to remarkably increase the operability of the apparatus because it is unnecessary to adjust divided images of the original by manually moving the original in the vertical and horizontal directions.

The individual components shown in outline or designated by blocks in the drawings are all well known in the image processing method and apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image synthesis apparatus comprising:
    first reading means for reading an image on a front surface of an original;
    second reading means for reading an image on a back surface of the original;
    setting means for setting a mode of reading images on a folded original;
    connection means for connecting an image on a first surface of the folded original read by said first reading means and an image on a second surface of the folded original read by said second reading means to each other as a single image when the mode has been set by said setting means; and
    processing means for processing the image connected by said connection means.

2. An apparatus according to claim 1, wherein said connection means serially connects an image signal for one line output from said first reading means and an image signal for one line output from said second reading means to each other.

3. An apparatus according to claim 1, further comprising:
    a memory for storing the image read by said first reading means and the image read by said second reading means; and
    correction means for correcting skew of the respective images stored in said memory.

4. An apparatus according to claim 3, wherein said connection means connects the images corrected by said correction means to each other.

5. An image processing apparatus comprising:
    first reading means for reading an image on a front surface of an original;
    second reading means for reading an image on a back surface of the original;
    assigning means for assigning one of a first reading mode of reading an image on one surface of a small-size original, a second reading mode of reading images on both surfaces of the small-size original, and a third reading mode of reading an image on one surface of a large-size original; and
    processing means for processing an image signal output from said first reading means when the first reading mode has been assigned, and for processing an image signal output from said first reading means and an image signal output from said second reading means when the second reading mode or the third reading mode has been assigned.

6. An apparatus according to claim 5, wherein when the third reading mode has been assigned, said processing means connects the image signal output from said first reading means and the image signal output from said second reading means to each other as a single image of the original.

7. An apparatus according to claim 6, wherein when the third reading mode has been assigned, said first reading means reads an image on a first surface of a folded original, and wherein said second reading means reads an image on a second surface of the folded original.

8. An image synthesis method using an image reading apparatus comprising first reading means for reading an image on a front surface of an original and second reading means for reading an image on a back surface of the original, said method comprising the steps of:
    setting a mode of reading images on a folded original;
    reading an image on a first surface of the folded original by the first reading means, and reading an image on a second surface of the folded original by the second reading means;
    connecting the image on the first surface read by the first reading means and the image on the second surface read by the second reading means to each other as a single image; and
    processing the connected image.

9. A method according to claim 8, wherein the image on the first surface and the image on the second surface are read in units of a line in said reading step, and wherein an image on a first line of the first surface and an image on a first line of the second surface are serially connected to each other in said connecting step.

10. A method according to claim 8, further comprising the steps of:
    storing the image on the first surface and the image on the second surface in a memory; and
    correcting skew of the image on the first surface and the image on the second surface stored in the memory.

11. A method according to claim 10, wherein the image on the first surface and the image on the second surface whose skew has been corrected are connected to each other in said reading step.

12. An image synthesis method using an image reading apparatus comprising first reading means for reading an image on a front surface of an original and second reading means for reading an image on a back surface of the original, said method comprising the steps of:
    setting one of a first reading mode of reading an image on one surface of a small-size original, a second mode reading mode of reading images on both surfaces of the small-size original, and a third reading mode of reading an image on one surface of a large-size original; and
    processing an image signal output from the first reading means when the first reading mode has been set, and processing an image signal output from the first reading means and an image signal output from the second reading means when the second reading mode or the third reading mode has been set.

13. A method according to claim 12, wherein in said processing step, when the third reading mode has been set, the image signal output from the first reading means and the image signal output from the second reading means are connected to each other as a single image of the original.

14. A method according to claim 13, wherein in said processing step, when the third mode has been set, an image on a first surface of a folded original is read by the first reading means, and an image on a second surface of the folded original is read by the second reading means.

* * * * *

UNITED STATES PATENT AND TRADEMARK OFFICE
CERTIFICATE OF CORRECTION

PATENT NO. : 5,708,513

DATED : January 13, 1998

INVENTOR(S) : KAMON HASUO, ET AL.

It is certified that error appears in the above-identified patent and that said Letters Patent is hereby corrected as shown below:

COLUMN 2

Line 46, "a second mode" should read --a second--.

COLUMN 4

Line 10, "18" should read --16--.

COLUMN 5

Line 5, "108b" should read --106b--; and
    Line 8, "118a and 118b" should read --116a and 116b--.

COLUMN 6

Line 40, "108b" should read --105b--;
    Line 41, "108a" should read --106a--; and
    Line 42, "108b" should read --106b--.

COLUMN 7

Line 8, "in" (second occurrence) should read --in a--; and
    Line 39, "step" should read --step S3--.

COLUMN 9

Line 46, "38" should read --36--; and
    Line 56, "48c" should read --45c--.

UNITED STATES PATENT AND TRADEMARK OFFICE
CERTIFICATE OF CORRECTION

PATENT NO. : 5,708,513

DATED : January 13, 1998

INVENTOR(S) : KAMON HASUO, ET AL.

It is certified that error appears in the above-identified patent and that said Letters Patent is hereby corrected as shown below:

COLUMN 11

Line 2, "writting" should read --writing--;
    Line 38, "speficying" should read --specifying--; and
    Line 67, "disk" should read --disk 35--.

COLUMN 12

Line 2, "circuit" should read --circuit 17--;
    Line 3, "network" should read --network 37.--;
    Line 20, "unit" should read --unit 36.--; and
    Line 30, "108b" should read --106b--.

COLUMN 13

Line 33, "S81" should read --S61--;
    Line 34, "28" should read --25--; and
    Line 52, "FIG." should read --FIG. 6--.

COLUMN 14

Line 15, "38" should read --36--.

COLUMN 15

Line 8, "since" should be deleted.

UNITED STATES PATENT AND TRADEMARK OFFICE
CERTIFICATE OF CORRECTION

PATENT NO. : 5,708,513
DATED : January 13, 1998
INVENTOR(S) : KAMON HASUO, ET AL.

Page 3 of 3

It is certified that error appears in the above-identified patent and that said Letters Patent is hereby corrected as shown below:

COLUMN 16

Line 61, "a second mode" should read --a second--.

Signed and Sealed this

Eleventh Day of August 1998

Attest:

BRUCE LEHMAN

Attesting Officer

Commissioner of Patents and Trademarks